US010749440B2

(12) United States Patent
Toyoda et al.

(10) Patent No.: US 10,749,440 B2
(45) Date of Patent: Aug. 18, 2020

(54) POWER CONVERSION DEVICE WITH HIGH POWER CONVERSION EFFICIENCY

(71) Applicant: Mitsubishi Electric Corporation, Chiyoda-ku (JP)

(72) Inventors: Hajime Toyoda, Chiyoda-ku (JP); Takaaki Takahara, Chiyoda-ku (JP); Ryota Kondo, Chiyoda-ku (JP); Hiroyasu Iwabuki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/469,509

(22) PCT Filed: Aug. 24, 2017

(86) PCT No.: PCT/JP2017/030267
§ 371 (c)(1),
(2) Date: Jun. 13, 2019

(87) PCT Pub. No.: WO2018/146840
PCT Pub. Date: Aug. 16, 2018

(65) Prior Publication Data
US 2019/0393792 A1  Dec. 26, 2019

(30) Foreign Application Priority Data
Feb. 7, 2017  (JP) .................................. 2017-020057

(51) Int. Cl.
*H02M 3/335*  (2006.01)
*H02M 1/00*  (2006.01)

(52) U.S. Cl.
CPC ... *H02M 3/33569* (2013.01); *H02M 3/33523* (2013.01); *H02M 2001/0003* (2013.01)

(58) Field of Classification Search
CPC ...... H02M 7/12; H02M 7/1557; H02M 7/162; H02M 7/2176; H02M 3/28;
(Continued)

(56) References Cited

U.S. PATENT DOCUMENTS 9,692,238 B2 * 6/2017 Matsumoto ............. H02J 50/80
2008/0084723 A1 * 4/2008 Balakrishnan ........ H02M 3/335
363/97

(Continued)

FOREIGN PATENT DOCUMENTS

EP  2 908 405 A1  8/2015
EP  3 062 433 A1  8/2016
(Continued)

OTHER PUBLICATIONS

International Search Report dated Nov. 14, 2017 in PCT/JP2017/030267 filed Aug. 24, 2017.
(Continued)

*Primary Examiner* — Gustavo A Rosario-Benitez
(74) *Attorney, Agent, or Firm* — Xsensus LLP

(57) ABSTRACT

A power conversion device includes an input detector for detecting input parameters of the DC input to the inverter; an output detector for detecting output parameters of the DC output from the power converter device; a duty calculator for calculating a duty for the switching elements of the inverter; a frequency search range calculator for determining an upper limit and a lower limit of a frequency search range for determining the drive frequency after the operating condition is changed, using at least one parameter of the input parameters, the output parameters, and a duty parameter; and a frequency search processor for determining the drive frequency by searching the frequency search range.

17 Claims, 22 Drawing Sheets

(58) Field of Classification Search
CPC . H02M 2001/0016; H02M 2001/0048; H02M 3/335; H02M 3/33507; H02M 3/33523; H02M 1/44; H02M 1/12; H02M 5/458
See application file for complete search history.

(56) References Cited

U.S. PATENT DOCUMENTS

| | | | |
|---|---|---|---|
| 2013/0088177 A1* | 4/2013 | Niizuma | H02J 7/025 |
| | | | 318/139 |
| 2014/0334190 A1* | 11/2014 | Zhang | H02M 3/33507 |
| | | | 363/17 |
| 2014/0355315 A1* | 12/2014 | Watanabe | H02M 3/33546 |
| | | | 363/21.09 |
| 2015/0108929 A1 | 4/2015 | Nobe et al. | |
| 2015/0200607 A1 | 7/2015 | Fujii et al. | |
| 2015/0236518 A1 | 8/2015 | Matsumoto et al. | |
| 2016/0036319 A1* | 2/2016 | Katsumata | H02M 1/14 |
| | | | 363/126 |
| 2016/0105116 A1* | 4/2016 | Chang | H02M 3/33523 |
| | | | 363/21.13 |
| 2016/0254758 A1 | 9/2016 | Norimatsu et al. | |
| 2016/0308459 A1* | 10/2016 | Fujii | H02M 1/12 |
| 2016/0352241 A1* | 12/2016 | Takahashi | H02M 5/458 |
| 2017/0250614 A1* | 8/2017 | Pregitzer | H02M 3/33515 |
| 2018/0212508 A1* | 7/2018 | Kobayashi | G03G 15/5004 |

FOREIGN PATENT DOCUMENTS

| | | |
|---|---|---|
| JP | 2007-20379 A | 1/2007 |
| JP | 2013-188109 A | 9/2013 |
| JP | 2015-80343 A | 4/2015 |
| WO | WO 2014/049779 A1 | 4/2014 |

OTHER PUBLICATIONS

Extended European Search Report dated Jan. 20, 2020 in European Patent Application No. 17895934.2, 8 pages.

* cited by examiner

POWER CONVERSION DEVICE WITH HIGH POWER CONVERSION EFFICIENCY

TECHNICAL FIELD

The present invention relates to a power conversion device that is made up of semiconductor elements and a magnetic component to convert input DC power to AC power temporarily and to convert the AC power to DC power again.

BACKGROUND ARTS

Device miniaturization by reducing circuit loss is requested for a power conversion device that operates in a wide range of input/output voltages. Power conversion devices typically include semiconductor elements, and a magnetic component such as a transformer or a reactor, and mainly switching loss of the semiconductor elements, copper loss and iron loss of the magnetic component depend on drive frequency of the power conversion device. Varying the drive frequency in response to operating conditions of the power conversion device is conceived as a method of reducing loss of the power conversion device.

For example, there is proposed, for a power conversion device including an inverter configured with a plurality of semiconductor elements and an isolation transformer, a method of selecting on the basis of a detected outputs a frequency that minimizes loss of the power conversion device from among prepared table, data indicating a relationship between the outputs and the drive frequency (see Patent Document 1).

There is further proposed a method of driving a DC-DC converter that includes a full-bridge inverter, an isolation transformer, and a rectifier circuit. In the method, the drive frequency for the DC-DC converter is varied throughout from a lower limit to an upper limit within an operable range of the DC-DC converter every time the operating condition changes, to build in each time a relationship between the whole loss or the power conversion efficiency of the DC-DC converter and the drive frequency; and the curve indicating the relationship is searched for two or more local extremal points, to drive the DC-DC converter at a frequency that brings about the minimum loss or the maximum power conversion efficiency among frequencies of the two or more local extremal points (see Patent Document 2).

PRIOR ART DOCUMENTS

Patent Documents

Patent Document 1: WO2014/049779 A
Patent Document 2: JP2007-20379 A

SUMMARY OF THE INVENTION

Problem that the Invention is to Solve

However, since the method disclosed in Patent Document 1 selects, on the basis of the outputs of the power conversion device, the drive frequency from among the table data built previously, a problem of aggravation of the loss is raised owing to change of the environment surrounding the power conversion device and to its deterioration over time.

Moreover, the method disclosed in Patent Document 2 needs to vary the drive frequency throughout from a lower limit, to an upper limit within the operable range of the DC-DC converter in response to the operating conditions of the DC-DC convertor. Consequently, a large amount of calculation is needed to reach determination of the drive frequency, thus posing a problem of not keeping up with determination of the drive frequency when the output voltage varies from moment to moment for a load such as battery. While the DC-DC converter provided with a means for storing the drive frequency for each operation condition, the means needs to record the drive frequency for every operation condition, thus, raising a further problem in that the controller needs to have an enormous data capacity for the storage. Furthermore, since the DC-DC converter operates in wide range environment conditions when mounted in such as an electric vehicle, it is needed to take a long time for pre-verification.

The present invention is made to resolve the above problems and aimed at providing a power conversion device that is able to determine with less calculation a drive frequency that enhances the power conversion efficiency.

Means for Solving the Problem

A power conversion device according to the present invention includes an inverter configured with switching elements to convert a DC to an AC having a drive frequency for the switching elements by on/off-controlling the switching elements; a rectifier circuit configured to rectify the AC converted by the inverter to a DC; a magnetic component having a coil; wherein the power conversion device changes the drive frequency when operating condition of the power conversion device is changed, and the power conversion device further includes an input detector adapted to detect input parameters of the DC input to the inverter; an output detector adapted to detect output parameters of the DC output from the power converter device; a duty calculator adapted to calculate a duty that is an on-time ratio of the switching elements: a frequency search range calculator configured to determine an upper limit and a lower limit of a frequency search range for determining the drive frequency after the operating condition is changed, using at least one parameter of the input parameters detected by the input detector, the output parameters detected by the output detector, and a parameter that is the duty calculated by the duty calculator: and a frequency search processor adapted to determine the drive frequency after the operating condition is changed, by searching the frequency search range determined by the frequency search range calculator.

Advantage Effect of the Invention

The present invention can provide a power conversion device that is able to operate at high power-conversion efficiency with less calculation

EMBODIMENTS FOR CARRYING OUT THE INVENTION

Embodiment 1

Figure 1:
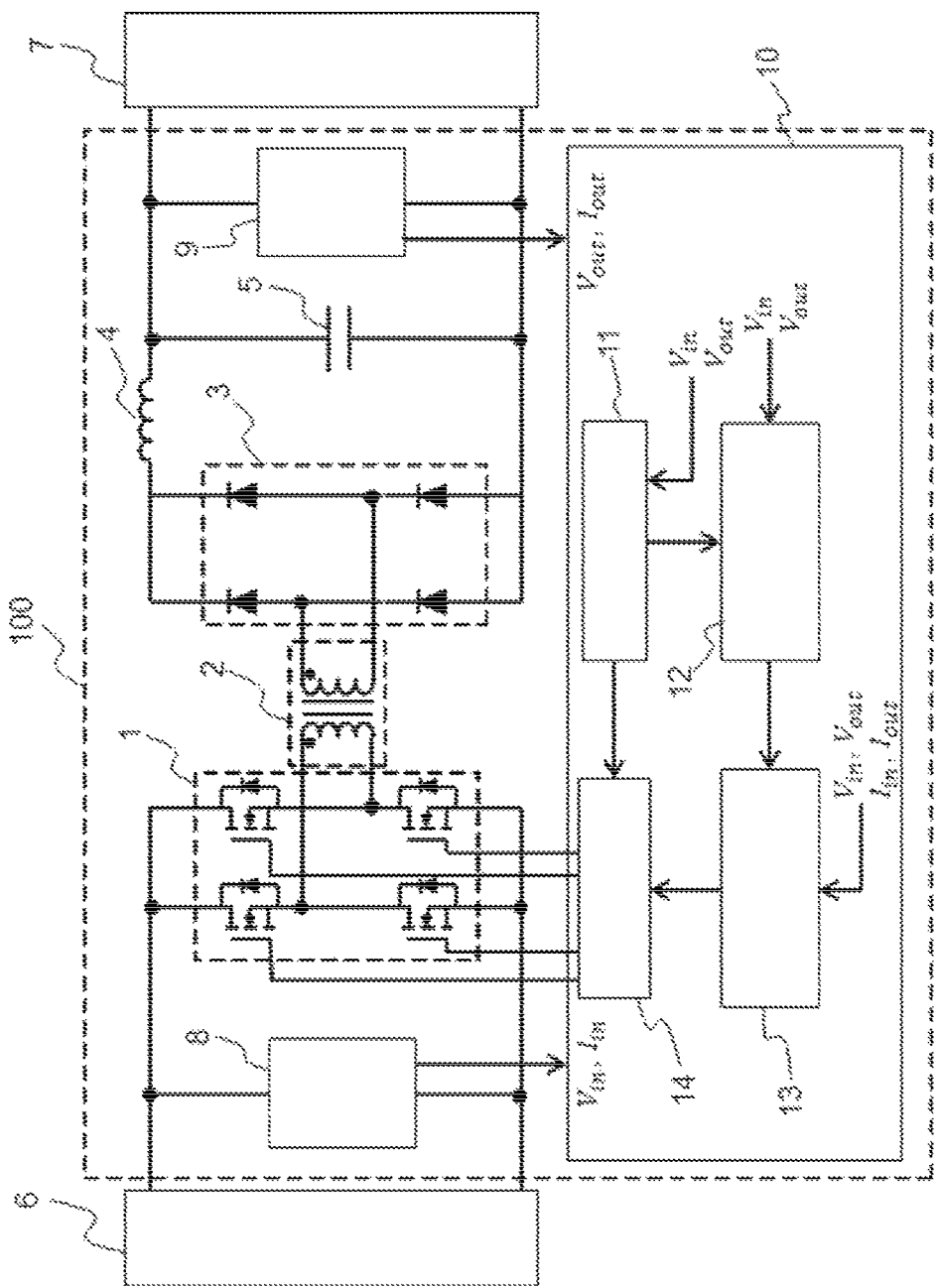
FIG. 1 is a block diagram showing a configuration of a power conversion device according to Embodiment 1 of the present invention.

A power conversion device according to Embodiment 1 of the present invention is described below on the basis of the relevant figures. FIG. 1 is a block diagram showing a configuration of the power conversion device according to Embodiment 1. The power conversion device 100 includes an inverter 1 composed of a plurality of switching elements, a transformer 2, a rectifier circuit 3 composed of a plurality of diodes, and output filters composed of a smoothing reactor 4 and a smoothing capacitor 5. The inverter 1 is controlled by a controller 10. The power conversion device 100 shown in FIG. 1 constitutes a so-called DC-DC converter.

The inverter 1 converts the DC voltage from a DC power source 6 to an AC voltage, to input the AC voltage to the transformer 2. The inverter 1 here is composed of four of the switching elements and configured with a circuit of two parallel connected legs each having a series-connection of the upper-arm switching element and the lower-arm switching element. One end of each upper arm and that of each lower arm of the inverter 1 are its positive input terminal and negative input terminal, respectively, and the output voltage of the DC power source 6 is applied across these input terminals. And, a connection point between the upper arm and the lower arm of the right leg and a connection point between the upper arm and the lower arm of the left leg are output terminals of the inverter 1, and the voltage across the output terminals of the inverter 1 applied to the primary winding of the transformer 2. In addition, the switching element used in the inverter 1 is preferably a transistor such as an insulated gate bipolar transistor (IGBT) having an inversely parallel-connected freewheel diode or a metal oxide semiconductor field effect transistor (MOSFET) having a diode connected between its source and drain. As the freewheel diode, a diode incorporated in the IGBT or the MOSFET or an external diode connected separately may be used.

The transformer 2 electrically insulatingly transforms the AC voltage input to its primary side to a stepped-up or stepped-down AC voltage in its secondary side, and outputs the stepped-up or -down AC voltage to the rectifier circuit 3. The rectifier circuit 3 rectifies the AC voltage input from the transformer 2. The rectifier circuit 3 here is composed of four of the diodes and configured with a circuit of two parallel connected legs each having a series-connection of the upper-arm diode and the lower-arm diode. The connection point between the upper arm and the lower arm of the right leg of the rectifier circuit 3 and the connection point between the upper arm and the lower arm of the left leg thereof are input terminals from the secondary winding of the transformer 2. And, one end of each upper arm and that of each lower arm of the rectifier circuit 3 are its positive output terminal and negative output terminal, respectively. One end of the smoothing reactor 4 is connected to the positive output terminal, and the smoothing capacitor 5 is connected between the negative output terminal and the other end of the smoothing reactor 4. In addition, the one end of the smoothing reactor 4 may be connected to the negative output terminal, and the smoothing capacitor 5 may be connected between the positive output terminal and the other end of the smoothing reactor 4. The smoothing reactor 4 and smoothing capacitor 5 remove ripple components in the voltage input from the rectifier circuit 3, to supply a DC power to a load 7.

The DC power source 6, which supplies DC power to the inverter 1, may be any device as long as it is able to supply DC power, such as for example a solar battery or a secondary battery, or may be a power converter such as an AC-DC converter. The load 7 is such as a resistive load or a battery load to which the DC power is supplied from the power conversion device 100.

The power conversion device is provided with an input detector 8 for detecting the voltage applied to and an input current flowing to the input, side of the inverter 1, and the detected DC voltage and current are output as detected signals to the controller 10. Note that depending on a control method or a control condition, the input detector 8 may in some cases be a detector that detects the DC voltage alone or the DC current alone. In essence, the input detector 8 may detect a necessary input parameter among the DC current and voltage input to the inverter 1. The power conversion device is further provided with an output detector 9 for detecting the voltage applied to and a current flowing to the load 7, and the detected DC voltage and current are output as detected signals to the controller 10. Depending on the control method or the control condition, the output detector 9 may also in some case be a detector that detects the DC voltage alone or the DC current alone. In essence, the output detector 9 may detect a necessary output parameter among the DC current and voltage output from the power conversion device 100.

The controller 10 includes a duty calculator 11, a frequency search range calculator 12, a frequency search processor 13, and a gate signal generator 14, to generate output of gate signals for driving the switching elements of the inverter 1 using the detected signals of the input detector 8 and the output detector 9. The duly calculator 11 calculates, on the basis of the detected signals of the output detector 9, a command for either one of the output voltage and the output current in response to conditions of the load 7, and calculates a duty for generating the gate signals for the switching elements of the inverter 1 so as to follow the calculated command, to output a duty signal indicative of the calculated duty to the gate signal generator 14.

The gate signal generator 14 generates a carrier corresponding to a drive frequency input from the frequency search processor 13 and performs pulse width modulation (PWM) control using the duty signal input from the duty calculator 11, and thereby generates the gate signals for the switching elements of the inverter 1, to output the gate signals to the gates of the switching elements.

The controller 10 is configured to change the drive frequency to a frequency at which the power conversion efficiency of the power conversion device 100 becomes maximal when the condition of the load 7 changes, i.e., when the operating condition of the power conversion device 100 is changed, thereby to operate the power conversion device 100. For that reason, the frequency search processor 13 searches the drive frequency. When the operating condition of the power conversion device 100 is changed, the frequency search range calculator 12 calculates and determined a lower limit and an upper limit of the drive frequency range to be searched, using at least one of parameters, such as the input parameters, the output parameters of the power conversion device 100 and the duty for the switching elements that have values before the driving frequency is changed. The frequency search processor 13 searches the frequency range between the determined lower limit and upper limit for a drive frequency at which the power conversion device 100 is to operate after the operating condition is changed. After searched, the power conversion device 100 operates at the frequency determined by the search.

Figure 22:
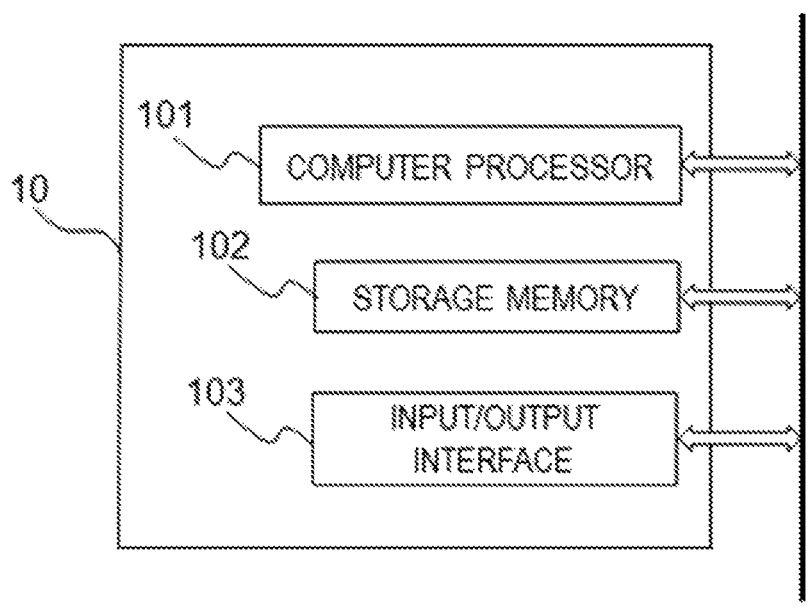
FIG. 22 is a block diagram showing an example of the hardware configuration of the controller of the power conversion device of the present invention.

Specifically, the controller 10 is made up of a computer processor 101 such as a central processing unit (CPU), a storage memory 102 for exchanging data with the computer processor 101, an I/O interface 103 for inputting/outputting signals between the computer processor 101 and the external, and the like, as shown in FIG. 22. The computer processor 101 may be provided with an application specific integrated circuit (ASIC), an integrated circuit (IC), a digital signal processor (DSP), a field programmable gate array (FPGA), and various types of signal processing circuits. The storage memory 102 has memory devices such as a random access memory (RAM) configured for the computer processor 101 to be able to read data therefrom and write data thereinto, a read only memory (ROM) configured for the computer processor 101 to be able to read data therefrom. The I/O interface 103 is made up of, for example, an A/D converter for inputting to the computer processor 101 the signals output from the input detector 8 and the output detector 9, a drive circuit for outputting signals to the inverter 1, and the like.

With the above configuration, each function of the duty calculator 11, the frequency search range calculator 12, frequency search processor 13, and the gate signal generator 14 provided in the controller 10 is implemented by the computer processor 101 executing the software (programs) stored in the storage memory 102 such as the ROM and cooperating with the storage memory 102 and the I/O interface 103. In addition, the computer processor 101 may be replaced with a plurality of processors of the same type or a plurality of processors of different types to share processing of each function.

Next, an operation of the power conversion device 100 according to embodiment 1 is described in detail. The power conversion device 100 electrically insulatingly steps up or steps down the DC power input from a DC power source 6, to supply the DC power to the load 7. The inverter 1 in the power conversion device 100 on/off-controls the switching elements on the basis of the gate signals input from the controller 10, to convert the DC voltage to the AC voltage. Then, the secondary winding of the transformer 2 electrically insulatingly steps-up or steps-down the AC voltage input to the primary side, and the rectifier circuit 3 rectifies the stepped-up or -down AC voltage to the DC voltage. After rectified, the ripple components are removed by the smoothing reactor 4 and the smoothing capacitor 5, and the DC power is supplied to the load 7.

The gate signals for driving the switching elements of the inverter 1 are generated by the gate signal generator 14 in the controller 10 by comparison between the duty signal and the carrier. The duty signal is calculated by the duty calculator 11 using the detected signals of the output detector 9 so as to follow the command for either one of the output voltage and the output current in response to conditions of the load 7. The carrier is determined from the drive frequency at which the power conversion efficiency of the power conversion device 100 becomes maximal, searched for by the frequency search processor 13 within the frequency search range determined by the frequency search range calculator 12 using detected signals of the input detector 8 and the output detector 9.

Figure 2:
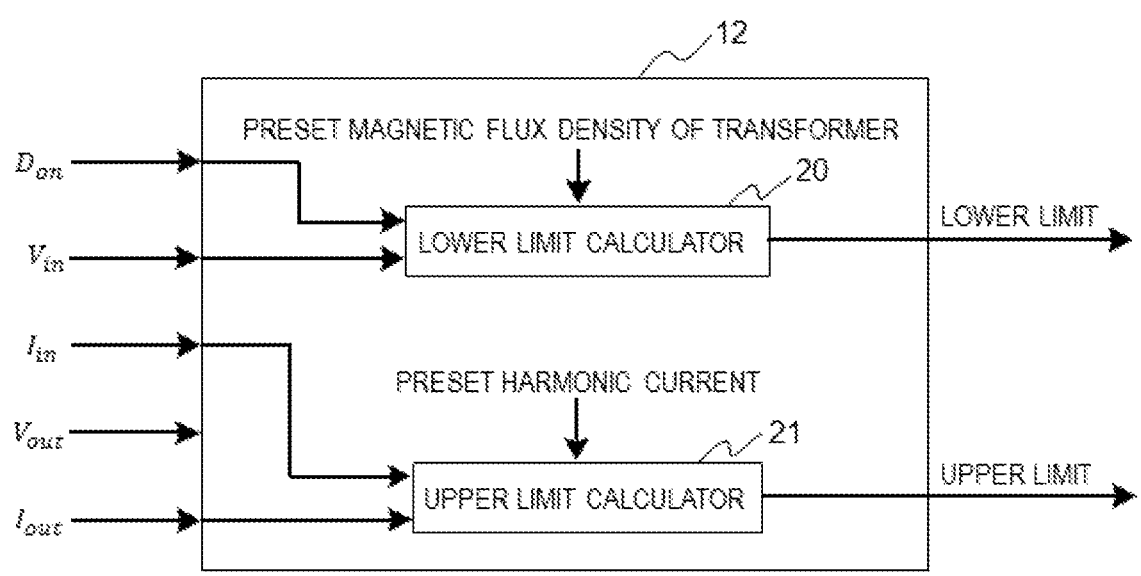
FIG. 2 is a block diagram showing a control of a frequency search range calculator of the power conversion device according to Embodiment 1.

Here, a method of determining the frequency search range by the frequency search range calculator 12 is described. FIG. 2 shows an example of the control block of the frequency search range calculator 12. In FIG. 2, the lower limit calculator 20 calculates a frequency at which the magnetic flux density of a magnetic component in the power conversion device 100 has a preset value. Here, a method for the calculation is described below by taking the transformer 2 as a magnetic component of interest. The lower limit calculator 21 calculates a frequency at which harmonic components of the input current and/or the output current of the power conversion device 100 has a preset value.

The frequency search range calculator 12 determines a lower limit, and an upper limit of the frequency search range using the detected signals from the input detector 8 and the output detector 9 and using the duty signal calculated by the duty calculator 11. The frequency search range calculator 12 shown in FIG. 2 determines by calculation the lower limit so that the magnetic flux density of the transformer 2 is within a range not exceeding the saturation magnetic flux density, in other words, determines by calculation a limit frequency that causes an unfavorable situation such as magnetic saturation when the magnetic flux density exceeds the range. A design operation is possible for a frequency equal to or higher than the lower limit because the magnetic flux is lower than the saturation magnetic flux density. Hence, the frequency is set as the lower limit. The calculation is made according to the following Eq. (1) using the input voltage to the power conversion device 100 and the duty signal calculated by the duty calculator 11:

$$f_{min} = \frac{1}{2} * (V_{in} * D_{on})/(N * A_e * \Delta B) \quad (1)$$

where $V_{in}$ is the input voltage to the power conversion device 100; $D_{on}$ is the duty; N is the number of turns of the transformer 2; $A_e$ is the cross-sectional area of the transformer 2; and $\Delta B$ is the magnetic flux density of the transformer 2. While the transformer 2 is taken here as a magnetic component of interest whose magnetic flux density is preset, it is better to choose a magnetic component whose magnetic flux density is more liable to saturate as the magnetic component of interest among those included in the power conversion device 100. If the smoothing reactor 4 is more liable to reach magnetic saturation than the transformer 2, the smoothing reactor 4 is preferably taken as a magnetic component of interest to determine the lower limit.

Furthermore, the upper limit is calculated as a frequency at which the harmonic components in the input current to and/or the output current of power conversion device 100 have the preset value. Letting the order of harmonic component be n, the harmonic components in the input current to and the output current of power conversion device 100 may be calculated for n ranging from n=2 to an appropriate positive integer. If the order n of a large harmonic component can be predicted, the frequency of the upper limit frequency may be determined from the n-th order harmonic component. The calculation is made in the upper limit calculator 21 by extracting the harmonic components using a Fourier series expansion or a Fourier transform of the waveform of the input current to and/or that of the output current of the power conversion device 100. It is conceivable that the above preset value is determined as follows: for example, the order of harmonic stipulated in the harmonic standard IEC6100-3-2 is reconverted to a frequency, and a maximum allowable harmonic-current value in a frequency band, for example, from a frequency of an m-th order harmonic to that of the (m+1)-th order harmonic is determined as the preset value that is calculated, with reference to the maximum allowable harmonic currents stipulated in IEC6100-3-2, as a value on the straight line connecting the maximum allowable harmonic-current value of the m-th order harmonic and that of the (m+1)-th order harmonic. Since the same power or the same current needs to be supplied to the load even if the frequency is changed, the total current is not changed largely; hence it is assumed that the total current, is not changed even if the drive frequency is changed. Further, assuming that the ratio of the harmonic currents to the total current is also the same as that of the derived harmonic currents, a highest drive frequency that brings about the allowable harmonic currents can be determined by calculation. The harmonic standard IEC6100-3-2 stipulates that the higher the order of harmonic, i.e., the higher the frequency of the harmonic, the lower the allowable current; hence, the drive frequency can be determined in the above manner. While in the above, the upper limit of the drive frequency is determined by setting the maximum allowable current of the harmonic components for each frequency band with reference to the harmonic standard IEC6100-3-2, the determination of the upper limit is not limited to this. The upper limit of the drive frequency can be determined by setting an allowable value of the harmonic components for the frequency or for each frequency band. As long as the drive frequency is equal to or lower than the determined upper limit, the power conversion device is allowed to operate, because a harmonic frequency when the power conversion device is driven at the drive frequency is equal to or lower than that of the same order harmonic when the power conversion device is driven at the upper limit frequency. Note that if which the input current or the output current has large harmonic components is predicted, there is no need to calculate the harmonic components of both the input current and the output current, i.e., only harmonic components of either one needs to be calculated.

In this way as described above, the frequency search range calculator 12 calculates the upper limit and the lower limit on the basis of operating parameters of the power conversion device 100 when the operating condition of the power conversion device 100 changes, whereby the frequency range to be searched by the frequency search processor 13 can be changed in response to the condition of the load 7.

Figure 3:
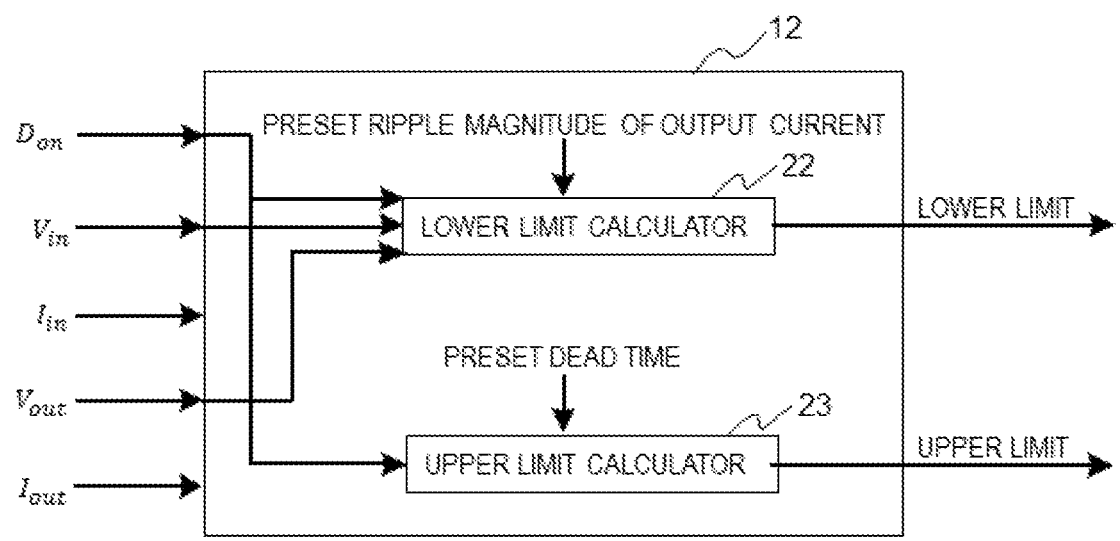
FIG. 3 is a block diagram showing a control of another frequency search range calculator of the power conversion device according to Embodiment 1.

The frequency search range calculator 12 may also make the calculation using the control block diagram shown in FIG. 3. In FIG. 3, the signals input to the frequency search range calculator 12 are the same as with FIG. 2. The lower limit calculator 22 determines by calculation a frequency at which a ripple magnitude of the output current of the power conversion device 100 has a preset value. The upper limit calculator 23 determines by calculation a frequency at which the off time of the gate signals has a preset value.

The lower limit is determined by calculation here as a frequency so that the ripple magnitudes $\Delta I_{pp}$ of the output, current of the power conversion device 100 has the preset value within a range that satisfies the specification of the load 7. The lower limit calculator 22 makes the calculation according to the following Eq. (2) using the input voltage to and the output, voltage of the power conversion device 100 and using the duty calculated by the duty calculator 11:

$$\Delta I_{pp} = \frac{1}{2} * (V_{in} * N - V_{out}) * D_{on}/L/f \quad (2)$$

where $V_{in}$ is the input voltage to and $V_{out}$ is the output voltage of the power conversion device 100; N, the number of winding of the smoothing reactor 4; $D_{on}$, the duty; L, a inductance of the smoothing reactor 4; and f is the drive frequency for the semiconductor elements. As seen from Eq. (2), when the drive frequency becomes higher, the ripple magnitude $\Delta I_{pp}$ becomes smaller. Hence, setting as the lower limit a frequency at which $\Delta I_{pp}$ has a preset value, $\Delta I_{pp}$ is equal to or smaller than the preset value in a frequency range at above the frequency.

The upper limit is determined by calculation as a frequency so that the off time of the gate signals has a value equal to or longer than a preset dead time. The calculation is made within a range that satisfies the following Eq. (3):

$$T_{off} = (1 - D_{on})/2f > t_d \quad (3)$$

by the upper limit calculator 23 using the duty calculated by the duty calculator 11, where $T_{off}$ is the off time of the gate signals and expressed by the duty $D_{on}$ and the drive frequency f for the switching elements; and $T_d$ is the dead time.

The dead time is set for an inverter having a full-bridge configuration or a half-bridge configuration with switching elements in upper and lower arms so that the switching elements of both arms are not in a concurrently turn-on state when each switching element is alternately turned on and off, and is determined in accordance with the specification of the switching elements and the like.

Using the control block shown in FIG. 3, the frequency range to be searched by the frequency search processor 13 can also be changed in response to the condition of the load 7, as with FIG. 2. In addition, to determine the upper limit and the lower limit of the frequency search range, the frequency search range calculator 12 may be configured with a combination of the lower limit calculator 20 of FIG. 2 and the upper limit calculator 23 of FIG. 3 or a combination of the upper limit calculator 21 of FIG. 2 and the lower limit calculator 22 of FIG. 3. Furthermore, the lower limit calculator 20 of FIG. 2 and the lower limit calculator 22 of FIG. 3 are provided, and a higher one of the lower limit determined by the lower limit calculator 20 of FIG. 2 and that determined by the lower limit calculator 22 of FIG. 3, i.e., a higher frequency may be employed as the lower limit. Similarly, the upper limit calculator 21 of FIG. 2 and the upper limit calculator 23 of FIG. 3 are provided, and a lower one of the upper limit determined by the upper limit calculator 21 of FIG. 2 and that determined by the upper limit calculator 23 of FIG. 3, i.e., a lower frequency may be employed as the upper limit.

Figure 4A:
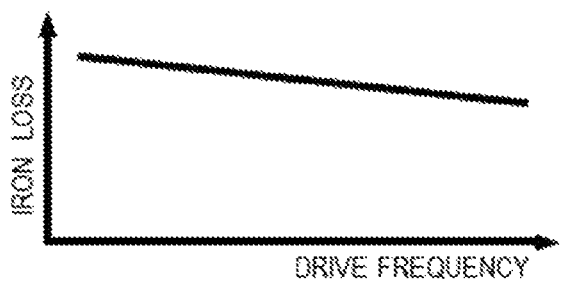
FIGS. 4A and 4B are graphs showing a relationship between a drive frequency and losses of a magnetic component and semiconductor elements constituting the power conversion device according to Embodiment 1.
Figure 4B:
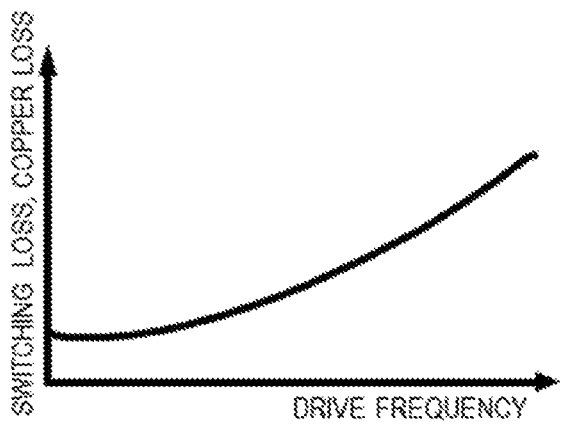
Figure 5:
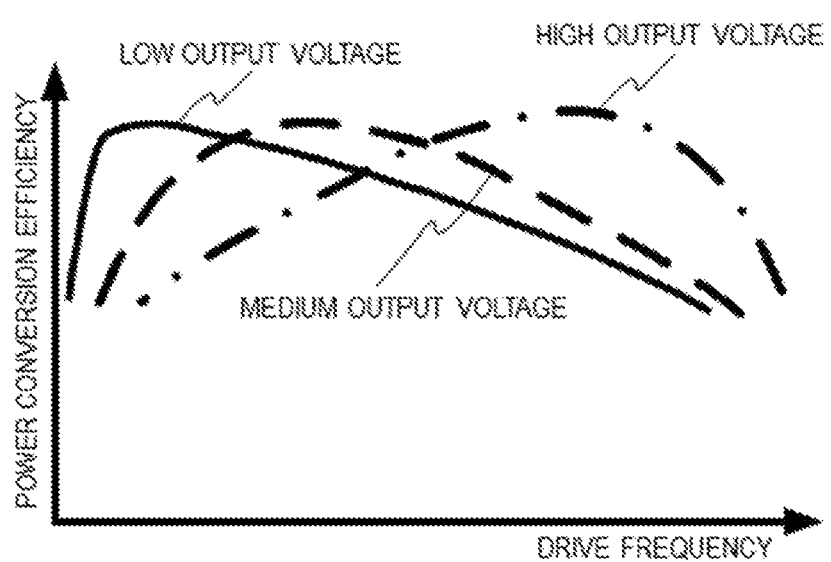
FIG. 5 is a graph for explaining a relationship between the drive frequency and the power conversion efficiency of the power conversion device according to Embodiment 1.

FIGS. 4A and 4B schematically show a drive-frequency dependent loss characteristic of each component. Switching loss of the switching elements and copper loss and iron loss of the magnetic component depend on the drive frequency. Comparing under the same operating condition, the switching loss and the copper loss tend to increase with increasing drive frequency as shown in FIG. 4B, and the iron loss tends to decrease with increasing drive frequency as shown in FIG. 4A. Moreover, since the output voltage or the output current of the power conversion device 100 varies in response to the condition of the load 7, the loss of the power conversion device 100 also varies accordingly. FIG. 5 shows, as an example, characteristics of the power conversion efficiency for variation of the drive frequency in cases of different output, voltages of the power conversion device 100 under the same power condition. Since the output current becomes lower as the output voltage becomes higher, the copper loss of the magnetic component is hard to increase and the iron loss becomes smaller. Accordingly, the power conversion efficiency has a tendency to be maximal in a higher drive frequency region as seen from the relationship shown in FIGS. 4A and 4B.

Since the frequency search range calculator 12 narrows the search range along the trend of the loss change in response to the output condition of the power conversion device 100 by the above-described calculation, the power conversion device according to Embodiment 1 can determine with leas calculation the drive frequency that brings about a high power conversion efficiency.

Figure 6:
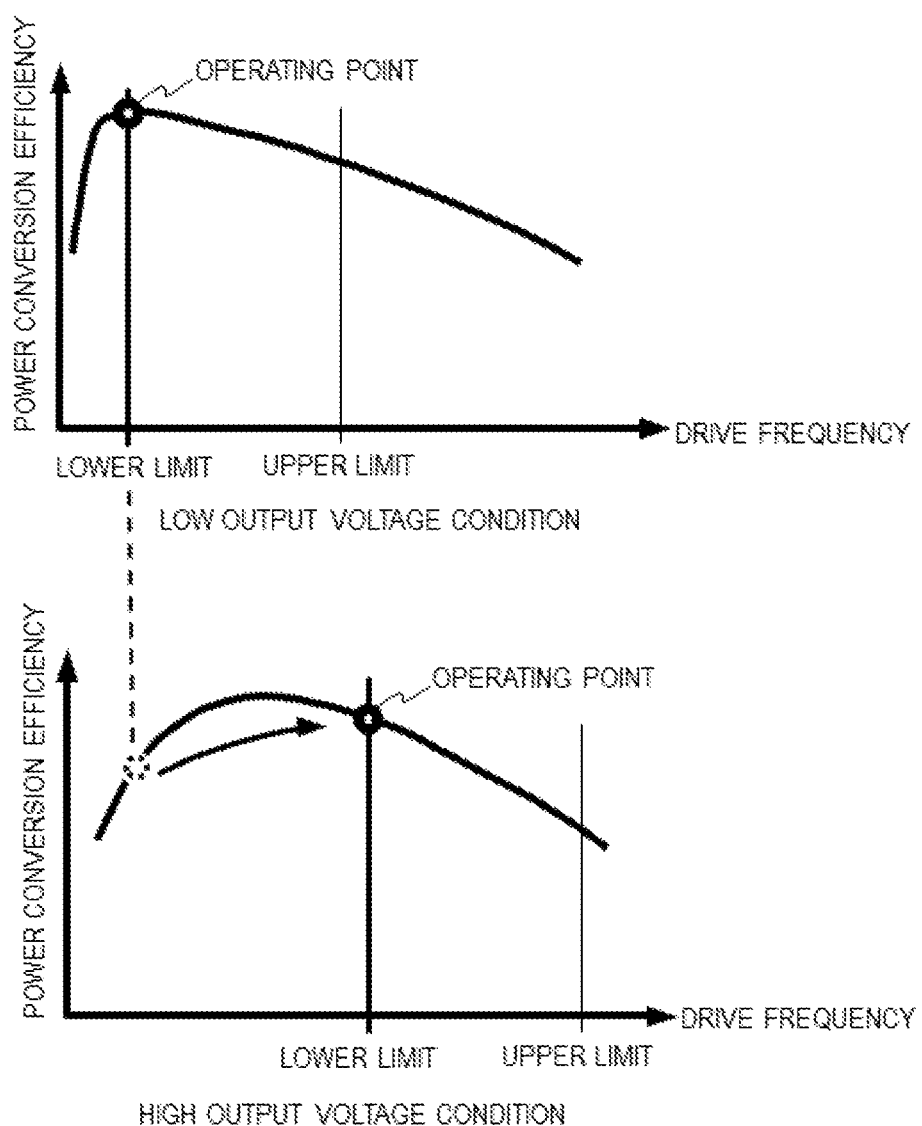
FIG. 6 shows graphs for explaining a method of determining the drive frequency in the power conversion device according to Embodiment 1.

Generally, in a case of the plurality of switching elements as in Embodiment 1 and loss of the winding of the magnetic component being more dominant than that of its core, the lower the drive frequency, the smaller the switching loss of the switching elements and the copper loss of the magnetic component. Accordingly, the power conversion device 100 operates with low loss. In this case, the lower limit frequency calculated by the lower limit calculator 20 or the lower limit calculator 22 is set as the drive frequency determined by the frequency search processor 13. For example, the magnetic flux density of the magnetic component is set smaller than its saturation magnetic flux density by the lower limit calculator 20 and the frequency search processor 13 controls the drive frequency to the lower limit frequency, whereby the magnetic flux density is smaller than the saturation magnetic flux density even under any load condition. Thus, even if the condition of the load 7 varies, operating at a drive frequency set as the lower limit allows for operation at a maximum power conversion efficiency point in a range of the magnetic flux density of the magnetic component being equal to or lower than its saturation magnetic flux density for a low output voltage condition and a high output voltage condition, as shown in the top graph and the bottom graph of FIG. 6.

It is noted that in a case of a power conversion device that does not satisfy the above condition, although its operating characteristic has a tendency close to the curves shown in FIG. 5, the operation at a minimum drive frequency is not necessarily the maximum efficiency operation. In order to operate the power conversion device 100 at a high power conversion efficiency point, it is desirable for the frequency search processor 13 to search the drive frequency.

Next, the search operation of the frequency search processor 13 is described with reference to the flowchart shown in FIG. 7. First, Step S1 sets the drive frequency to the lower limit determined by the frequency search range calculator 12. Step S2 receives the input voltage $V_{in}$ and the input current $I_{in}$ to and the output voltage $V_{out}$ and the output current $I_{out}$ of the power conversion device 100 from the input detector 8 and the output detector 9. Step S3 calculates the input power $P_{in}$ (=$V_{in} \times I_{in}$) and the output power $P_{out}$ (=$V_{out} \times I_{out}$), and calculates the power conversion efficiency $P_{out}/P_{in}$ using $P_{in}$ and $P_{out}$. Step S4 records in the controller 10 the power conversion efficiency $P_{out}/P_{in}$ calculated in Step S3. Step S5 determines whether or not the driving frequency is equal to or higher than the upper limit determined by the frequency search range calculator 12. If not equal to nor higher than the upper limit, Step S6 changes the driving frequency by a frequency change amount $\Delta f$ toward the upper limit. Then, the above operations are repeated from Step S2, and if the drive frequency is equal to or high than the upper limit, the flow proceeds to Step S7. Step S7 determines the drive frequency at the maximum power conversion efficiency point within the range determined by the frequency search range calculator 12, and the determined drive frequency is set as the output of the frequency search processor 13. In addition, based on the frequency search range from the lower limit to the upper limit, various setting methods are conceivable for the frequency change amount $\Delta f$, for example, $\Delta f$ is set such as $\frac{1}{10}$ or $\frac{1}{100}$ of the frequency search range, or is preset as an appropriate fixed value, or the like.

The maximum power-conversion efficiency point here is nothing but the minimum loss point of the power conversion device 100. Hence, the frequency search processor 13 may calculate and record the total loss of the power conversion device 100 in Steps S30, S40, S50 shown in FIG. 8 instead of Steps S3, S4 of the flowchart shown in FIG. 7, and determine in Step S70 the drive frequency that brings about the minimum total loss, to output the drive frequency.

The operation of the frequency search processor 13 is described in detail with reference to the flowchart shown in FIG. 8. First, loss of power conversion device 100 is described. In Embodiment 1, major losses are caused in the semiconductor elements constituting the inverter 1 and the rectifier circuit 3, in the magnetic components of the transformer 2 and the smoothing reactor 4, in the filters provided to the input and output sections of the power conversion device, and in the wiring pattern. The loss of the semiconductor elements includes switching loss and conduction loss, and the loss of the magnetic component includes iron loss and copper loss. Among these losses, the switching loss of the semiconductor elements, and the copper loss and the iron loss of the magnetic component vary depending on the drive frequency.

Switching loss $P_{sw}$ is generally expressed by the following Eq. (4):

$$P_{sw} = \frac{1}{2} * V * I_{avg} * (t_{on} + t_{off}) * f \tag{4}$$

where V is an applied voltage to the switching elements, $I_{avg}$ is the average of a flowing current through the switching elements, $t_{on}$ is a turn-on time of the switching elements, $t_{off}$ is a turn-off time of the switching elements and f is a drive frequency of the switching elements. Iron loss $P_{core}$ is expressed by the following Eq. (5):

$$P_{core} = (V_{core} * T)/(N * A_e) \tag{5}$$

where $V_{core}$ is an applied voltage to a magnetic component, N is the number of turns of the magnetic component. $A_e$ is the effective cross-sectional area of the magnetic component, and T is a duration of the voltage applied to the magnetic component and defined as T=1/f. Copper loss $P_{cu}$ is expressed by the following Eq. (6):

$$P_{cu} = \Sigma(R_{cu} * I_{cu}^2) \tag{6}$$

where $I_{cu}$ is the root-mean-square value of the current, flowing through the winding of the magnetic component, and $R_{cu}$ is the ohmic resistance value thereof. The ohmic value $R_{cu}$ depends on the drive frequency and tends to increase with increasing drive frequency of the circuit. The copper loss is a summation of losses calculated for each order of harmonic.

Figure 7:
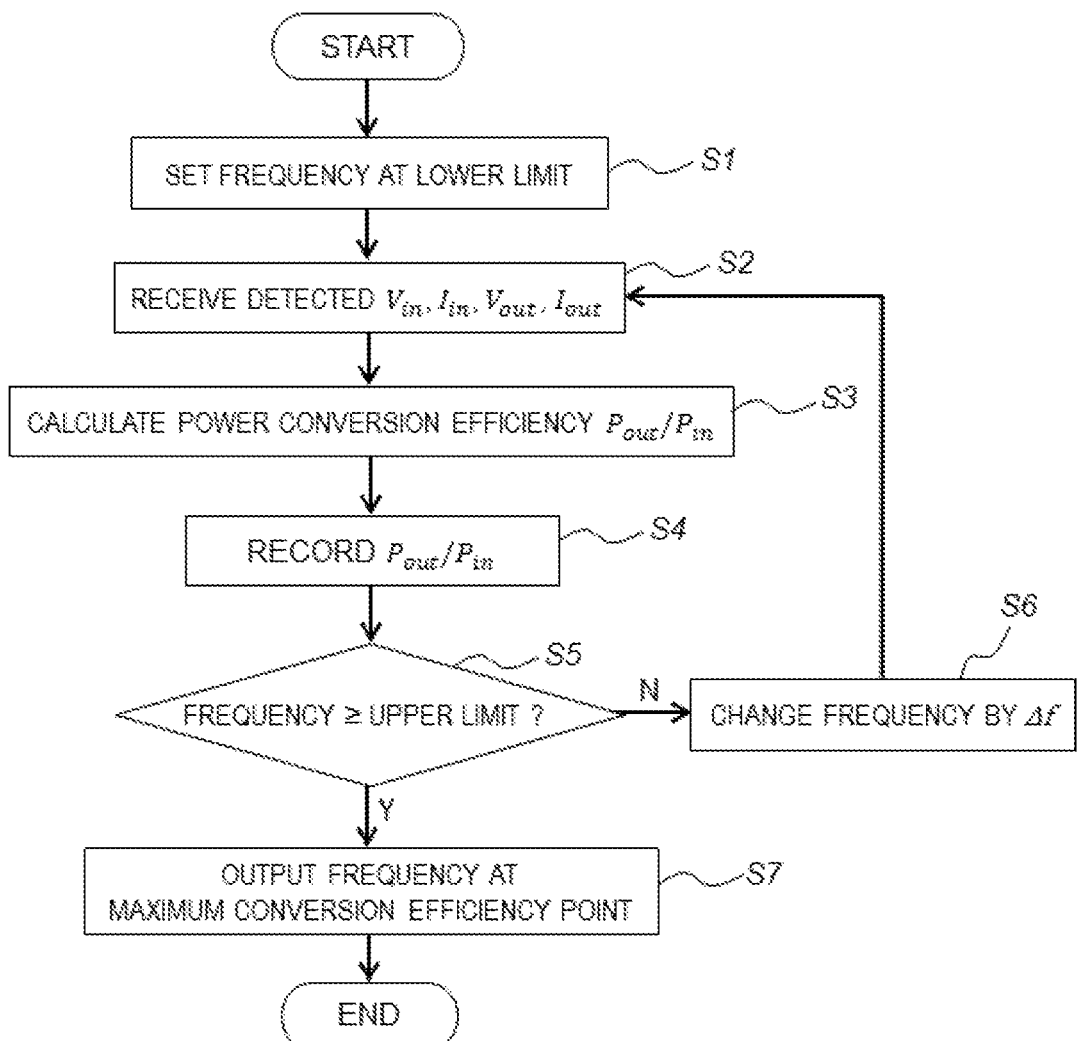
FIG. 7 is a flowchart showing a frequency search flow of a frequency search processor of the power conversion device according to Embodiment 1.
Figure 8:
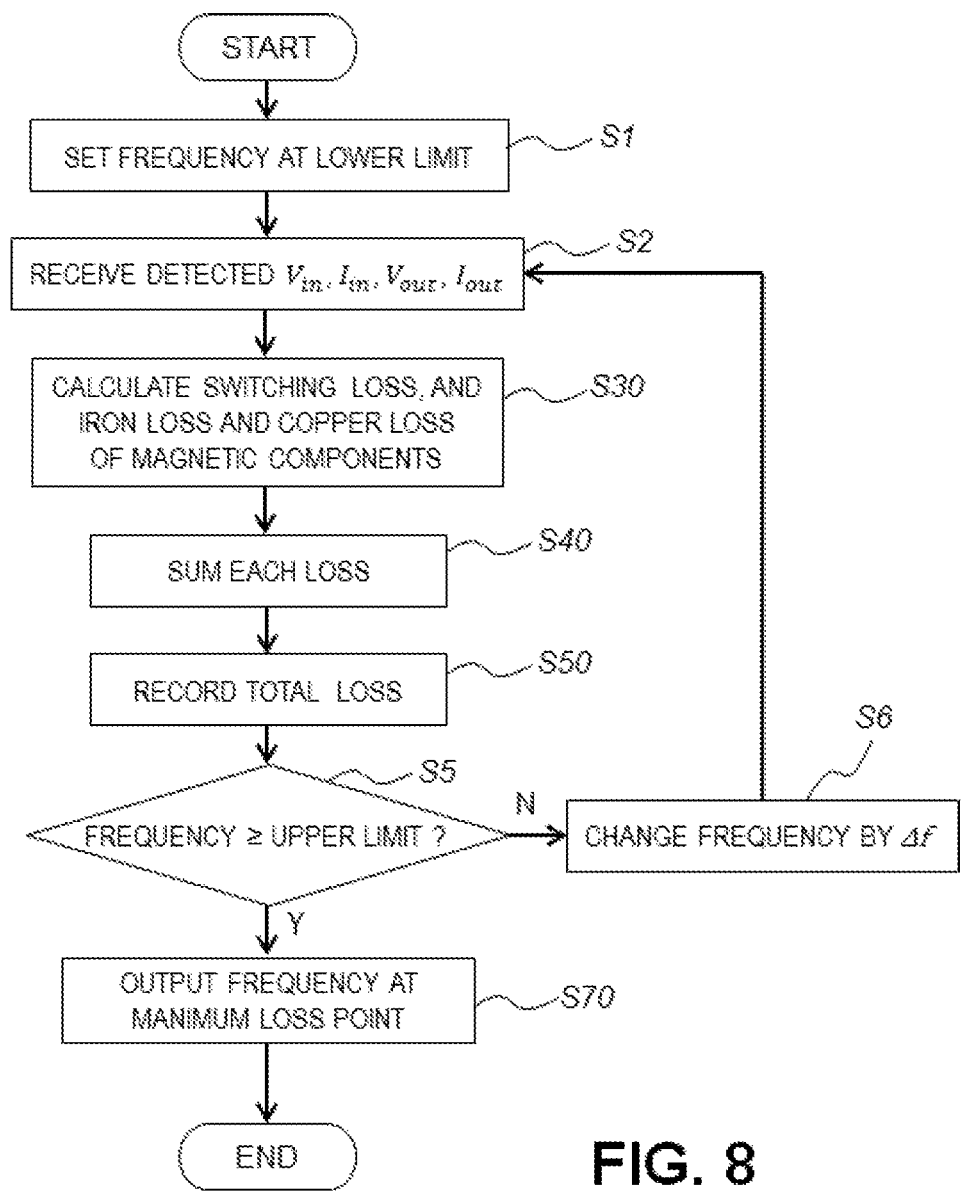
FIG. 8 is a flowchart showing another frequency search flow of the frequency search processor of the power conversion device according to Embodiment 1.

The flowchart shown in FIG. 8 is described on the basis of the above-described total loss. Note that since Steps shown in FIG. 8 except for Steps S30 to 50 and Step S70 are the same as those shown in FIG. 7, their explanations are omitted. Step S30 calculates the switching loss of the switching elements, the iron loss of the magnetic component, and the copper loss of the magnetic component are calculated using Eqs. (4), (5) and (6), respectively. Since the terms in each equation except for concerning the voltage, the current, and the frequency are determined beforehand in the design phase, the calculations of Eqs. (4) to (6) are made using the detected signals from the input detector 8 and the output, detector 9 as well as using these design values. Step S40 sums each loss calculated in Step S30, to calculate a total loss depending on the drive frequency. Step 50 records in the controller 10 the total loss calculated in Step S40. Step S70 determines as the output of the frequency search processor 13 a frequency at the minimum loss point.

Figure 9A:
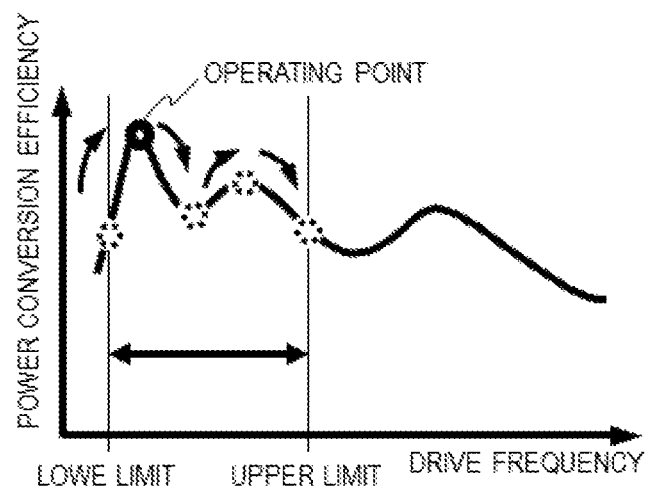
FIGS. 9A and 9B are graphs for explaining an operation of the power conversion device according to Embodiment 1.
Figure 9B:
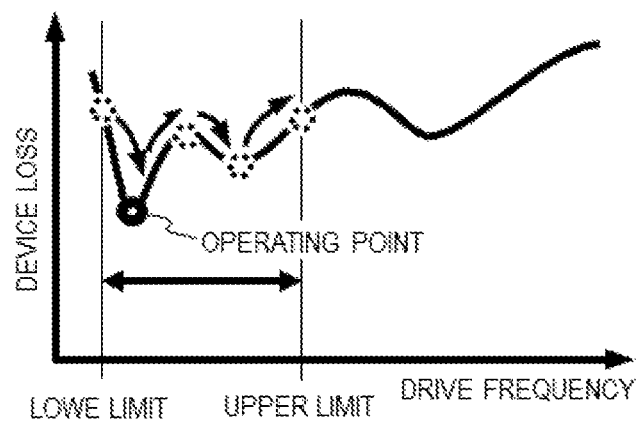

Following the flow shown in either one of the flowcharts of FIG. 7 or FIG. 8 allows the power conversion device 100 of the present invention to drive the switching elements of the inverter 1 at a drive frequency that brings about the maximum power conversion efficiency (FIG. 9A) or the minimum loss (FIG. 9B) within the frequency search range determined as shown in FIGS. 9A and 9B by the frequency search range calculator 12. The search flow shown in FIGS. 7 and 8 are particularly effective for a case where the relationship between the power conversion efficiency or the loss of the power conversion device 100 and its drive frequency is expressed by a third- or higher-order curve as shown in FIGS. 9A and 9B.

Figure 10:
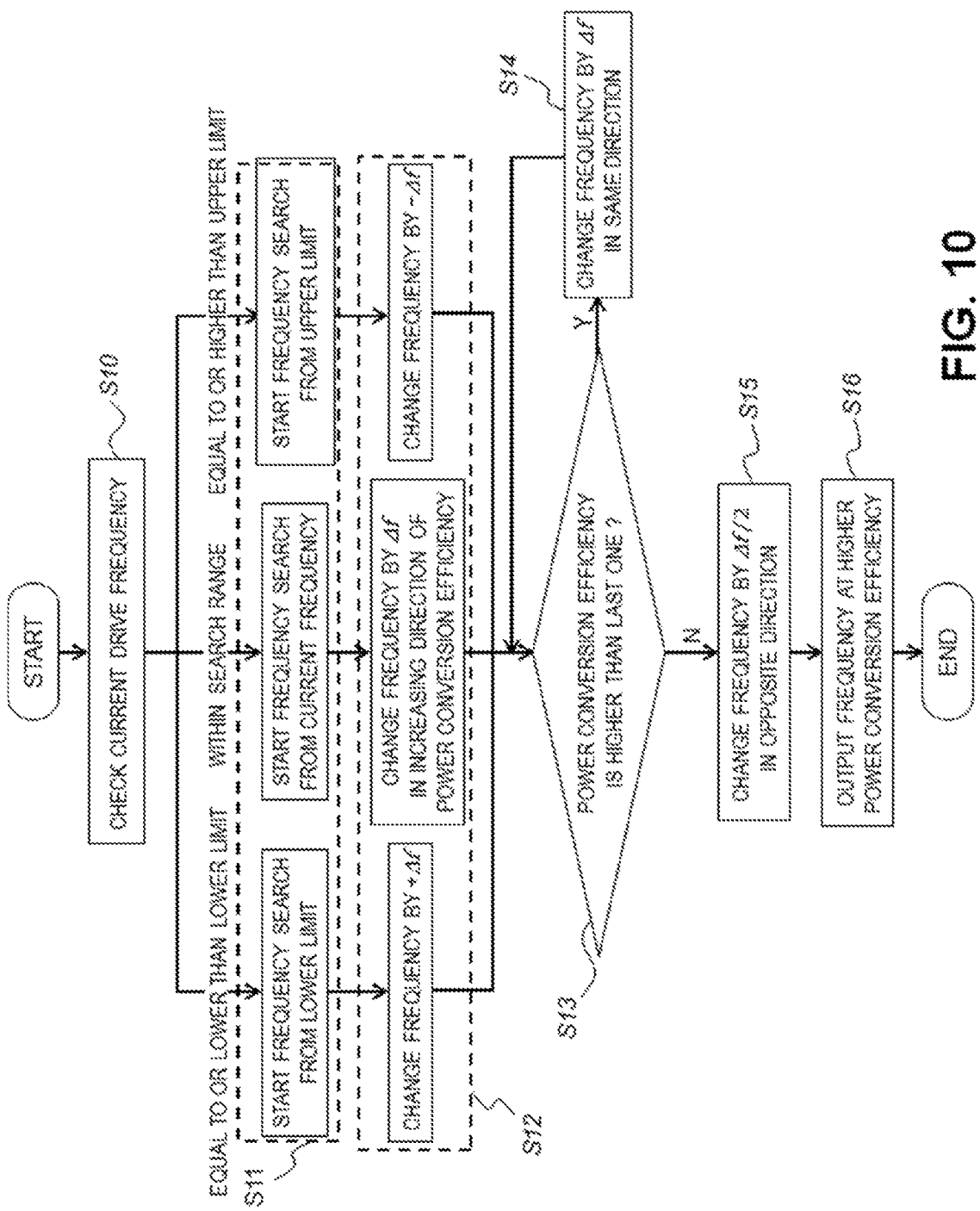
FIG. 10 is a flowchart showing still another frequency search flow of the frequency search processor of the power conversion device according to Embodiment 1.

Next, an operation of the frequency search processor 13 is described for a case of the curve being a quadratic curve with reference to the flowchart shown in FIG. 10. In a case of loss of one component of the power conversion device 100 being dominant, for example, the loss of the transformer 2 being dominant in the whole loss of the power conversion device, the relationship is expressed by a quadratic curve. Since quadratic curves have only one extremal point, the search need not be made over the entire frequency search range from the lower limit to the upper limit. This allows for employment of the frequency search flow as shown in FIG. 10.

Step S10 checks current drive frequency. Step S11 determines whether the drive frequency is within the range determined by the frequency search range calculator 12, equal to or lower than the lower limit determined thereby, or equal to or higher than the upper limit determined thereby; and then, the frequency search is started from the lower limit if equal to or lower than the lower limit or started from the upper limit if higher than the upper limit or started at current operating point if within the range between the lower limit and the upper limit. Executing this step allows the frequency search to be performed by excluding an unnecessary search range. Step S11 further receives the input voltage $V_{in}$, the input current $I_{in}$ to the power conversion device and the output voltage $V_{out}$, the output current $I_{out}$ thereof from the input detector 8 and the output detector 9, to calculate the input power $P_{in}$ (=$V_{in} \times I_{in}$), the output power $P_{out}$ (=$V_{out} \times I_{out}$), and the power conversion efficiency $P_{out}/P_{in}$ using them.

Next, Step S12 increases the drive frequency by the set frequency-change amount $\Delta f$ when the frequency search is started from the lower limit, or decrease the drive frequency by $\Delta f$ when the frequency search is started from the upper limit. And when the frequency search is started from the current operation point, the drive frequency is changed by $\Delta f$ in the direction for the power conversion efficiency to become higher when the drive frequency is shifted up and down by $\Delta f$. Step S12 further calculates the power conversion efficiency after the drive frequency is changed. After Step S12 is executed, Step S13 determines whether the calculated power conversion efficiency is higher or lower than the last calculated one. If higher ("Y" in Step S13), then the flow branches to Step S14, in which the frequency is changed by $\Delta f$ in the same direction as the last changing direction, to calculate the power conversion efficiency. Step S14 and Step S13 is repeated until the power conversion efficiency becomes lower than the last one calculated before the frequency is changed by $\Delta f$.

If the power conversion efficiency is equal to or lower than the last one in the determination of Step S13 ("N" in S13), the flow proceeds to Step S15, and the frequency is changed by $\Delta f/2$ in the direction opposite to that of last change and the power conversion efficiency is calculated. Step 316 compares the power conversion efficiency calculated in Step S15 with that calculated before the frequency is changed by $\Delta f/2$, to output the frequency that brings about a higher power conversion efficiency.

Figure 11A:
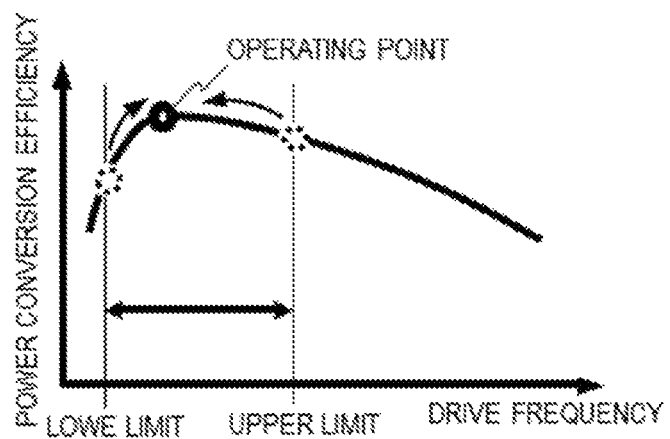
FIGS. 11A and 11B are graphs for explaining another operation of the power conversion device according to Embodiment 1.
Figure 11B:
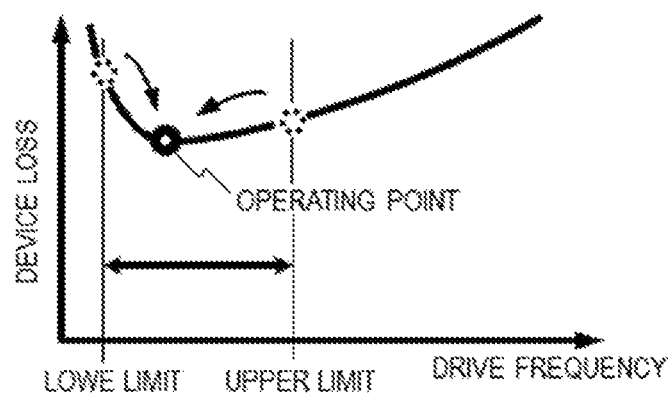

Also in the flowchart shown in FIG. 10, the drive frequency that brings about the minimum loss point may be searched by calculating losses of the components of the power conversion device 100 not by calculating the power conversion efficiency of the power conversion device 100, as the frequency search flow of FIG. 7 is altered to that of FIG. 8. FIGS. 11A and 11B graphically illustrate how the maximum power conversion efficiency point is searched for (FIG. 11A) and how the minimum loss point is searched for (FIG.

11B) instead of the maximum power conversion efficiency point according to the flowchart shown in FIG. 10. As illustrated in FIGS. 11A and 11B, the power conversion device 100 according to Embodiment 1 of the present invention is able to drive the switching elements of the inverter 1 at the drive frequency that brings about the maximum power conversion efficiency or the minimum loss within the range determined by the frequency search range calculator 12.

Figure 12:
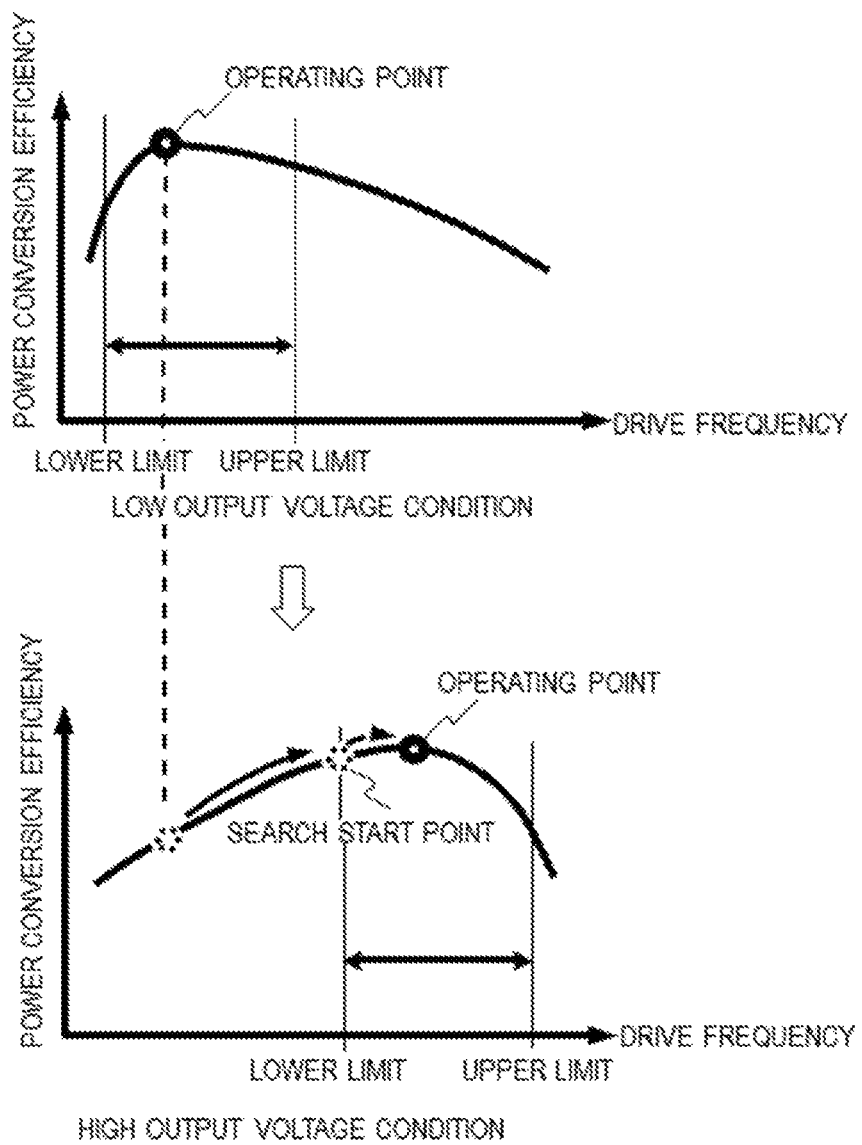
FIG. 12 shows graphs for explaining the operation of the power conversion device according to Embodiment 1 when the load condition changes.

Actual conditions of the load 7 are not uniform. The operation according to the present invention when the output voltage of the power conversion device 100 applied to the load 7 changes from a low voltage to a high voltage under the same output power condition is described here with reference to FIG. 12. In FIG. 12, the curves expressing the relationship between the drive frequency and the power conversion efficiency of the power conversion device 100 are assumed to be a quadratic curve as an example.

A case is assumed here in which the load 7 changes to a high output voltage condition as shown in the bottom graph of FIG. 12 when the power conversion device 100 is operating at the maximum power conversion efficiency in a low output voltage condition as shown in the top graph of FIG. 12. Since the current operating point in this case is lower than the lower limit determined for the high output voltage condition by the frequency search range calculator 12, the starting point of the frequency search is set to the lower limit for the high output voltage condition at the moment when the controller 10 recognizes that the load changes to the high output voltage condition as shown in the bottom graph of FIG. 12. Then, the drive frequency is searched for through the flowchart shown in FIG. 7, FIG. 8, or FIG. 10 and thereby reached at the maximum power conversion point for the high output voltage condition.

In this way as described above, no search is needed between the operating frequency under a lower output voltage condition and the lower limit frequency for a high output voltage condition. Thus, applying the present invention allows for reduction of the calculation amount needed to search a maximum power conversion efficiency point and allows for quick shift to and operation at a high power conversion efficiency point in comparison with a case of not restricting the frequency search range.

Figure 13:
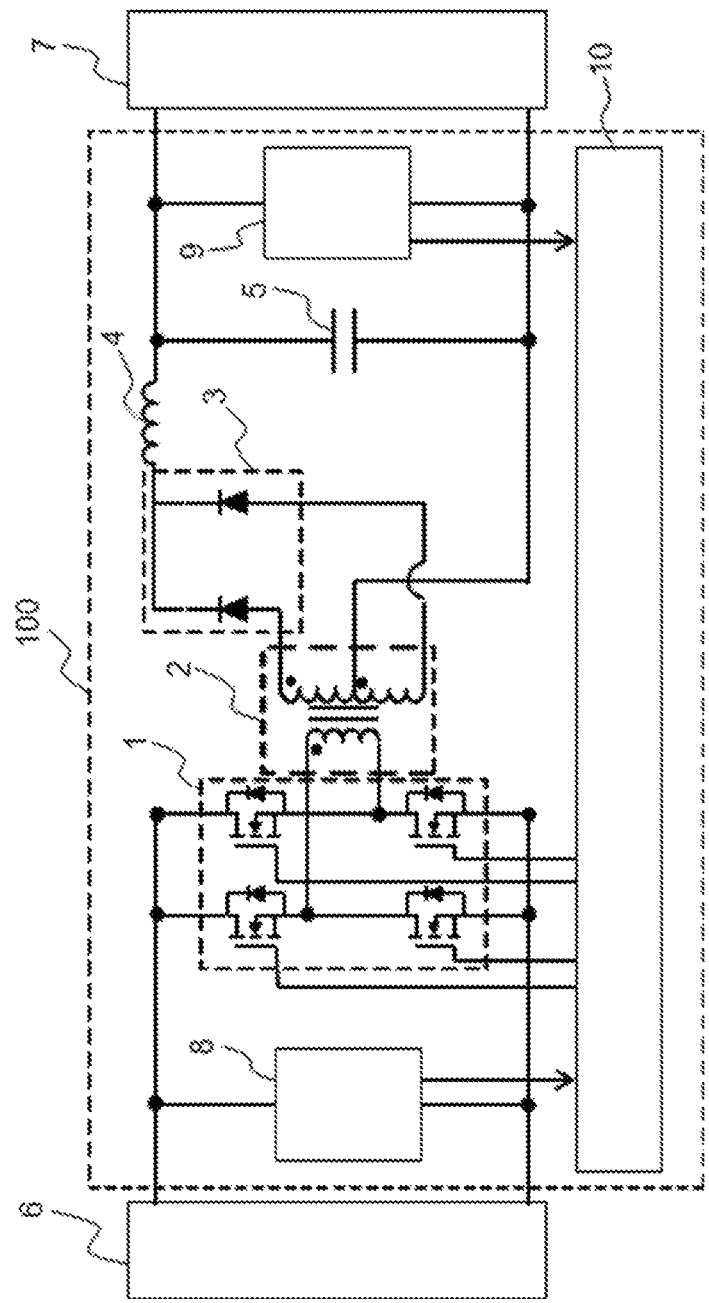
FIG. 13 is a circuit diagram showing the configuration of another power conversion device according to Embodiment 1.
Figure 14:
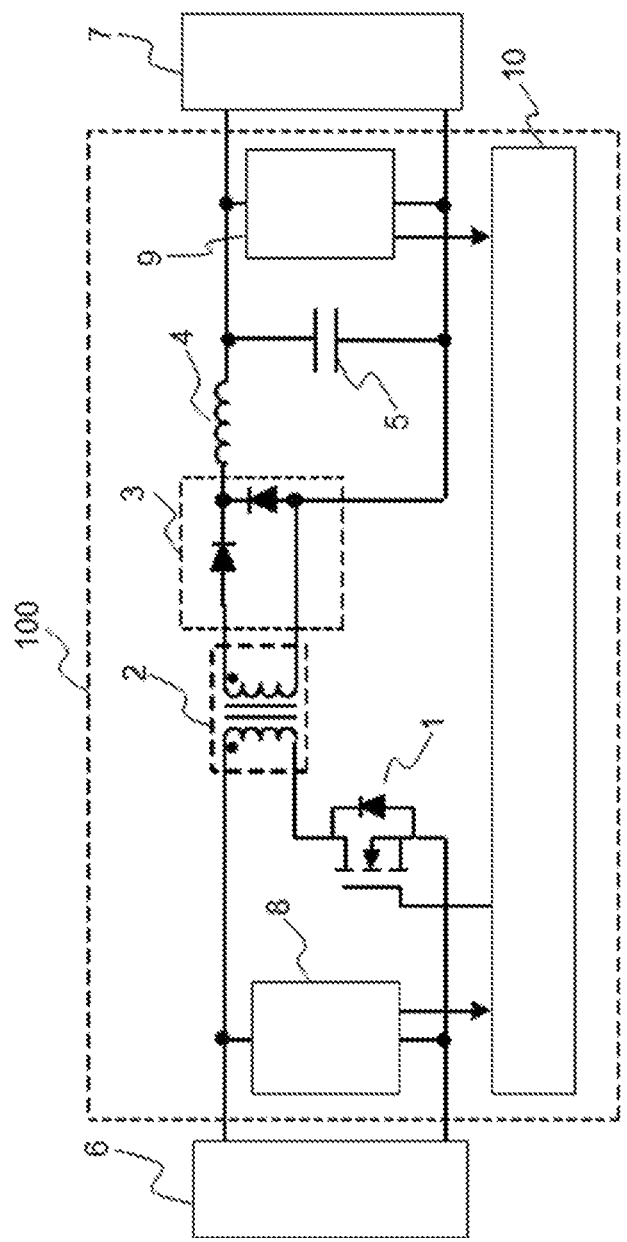
FIG. 14 is a circuit diagram showing the configuration of still another power conversion device according to Embodiment 1.

It is noted that Embodiment 1 of the present invention is also applicable to a power conversion device configured with a transformer 2 that has a middle point in the secondary winding and a center-tap type rectifier circuit 3 as shown in FIG. 13. Moreover, Embodiment 1 of the present invention is also applicable to an inverter of the power conversion device not only with a full-bridge configuration having four of the switching elements but also with a half-bridge configuration having two of the switching elements using either one of the right and the left legs. Furthermore, Embodiment 1 of the present invention is also applicable to a single ended forward converter configured with one switching element as shown in FIG. 14. Still further, not only the PWM control but also other controls may be used as the control method for the switching element in the inverter 1. It is noted that use of the dead time as according to Eq. (3) cannot be employed as the method of determining the upper limit for the one switching-element configuration shown in FIG. 14.

Embodiment 2

A power conversion device according to Embodiment 2 of the present invention is described below on the basis of the relevant figure. First, the circuit configuration of a step-up chopper-type power conversion device according to Embodiment 2 is described with reference to FIG. 15. Note that components shown in FIG. 15 that have the same function as those in the configuration shown in FIG. 1 are assigned the same reference numerals.

Figure 15:
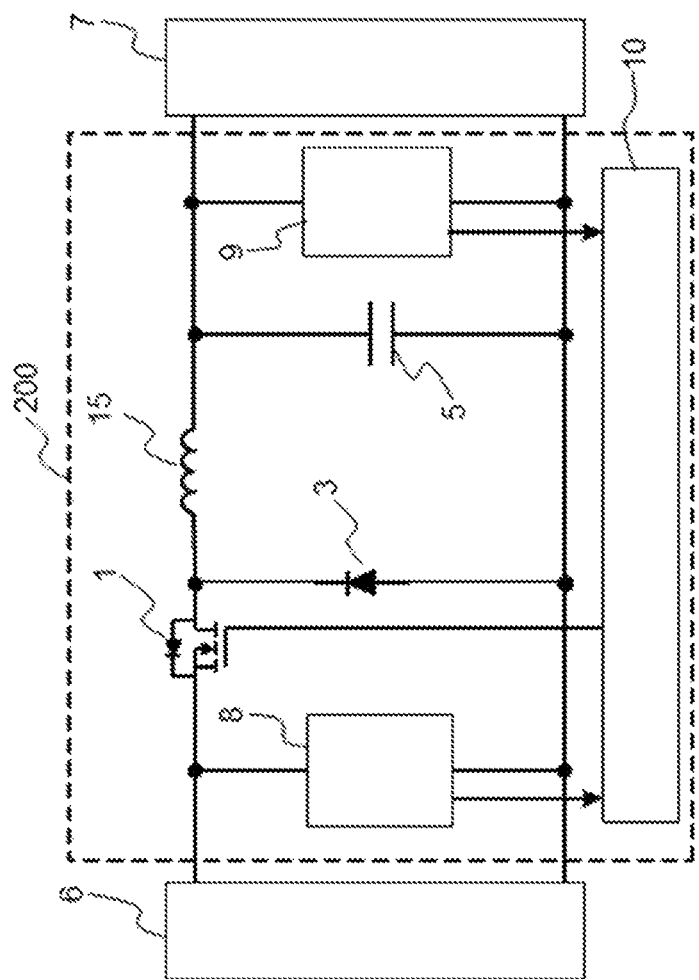
FIG. 15 is a circuit diagram showing the configuration of a power conversion device according to Embodiment 2 of the present invention.

In FIG. 15, the power conversion device 200 includes an inverter 1 composed of a single switching element, a rectifier circuit 3 composed of a single diode, an inductor 15, the smoothing capacitor 5, the input detector 8, and the output detector 9. The inverter 1 converts the DC voltage from the DC power source 6 to an AC voltage. The rectifier circuit 3 rectifies the AC voltage output from the inverter 1. The inductor 15 charges energy while the inverter 1 transmits no power and discharge the energy accumulated while the inverter 1 transmits power. The smoothing capacitor 5 removes ripple components from the rectified voltage, to supply a DC power to the load 7.

Next, the operation of the Embodiment 2 is described. The power conversion device 200 steps up the DC voltage input from the DC power source 6, to supply the stepped-up DC voltage to the load 7. The inverter 1 converts the DC voltage from the DC power source 6 to the AC voltage by on/off-controlling the switching element on the basis of the gate signal generated by the controller 10, and the rectifier circuit 3 rectifies the AC voltage. At that time, the inductor 15 generates the stepped-up DC voltage by charging energy while the inverter 1 transmits no power and discharging the energy while the inverter 1 transmits power. The AC ripple contained in the rectified voltage is removed by the smoothing capacitor 5, and the DC power is supplied to a load 7.

The controller 10 has the same configuration and operates in the same manner as the controller 10 described in Embodiment 1. It is noted that since the inverter 1 of Embodiment 2 has one switching element, the controller 10 generates one output to control the switching element. Generation process of the gate signal for driving the switching element of inverter 1, in particular, determination process of the drive frequency is the same as with Embodiment 1, that, is, the drive frequency is determined by searching for a frequency that maximizes the power conversion efficiency or minimizes the loss within the frequency range determined by the frequency search range calculator 12. It is also noted that use of the dead time as according to Eq. (3) cannot be employed as the method of determining the upper limit because of one switching element. The switching element is on/off-controlled by the gate signal having the determined drive frequency.

In addition, the configuration of the power conversion device according to Embodiment 2 of the present invention can be applied also to the circuit configuration of a step-down chopper that is capable of supplying a DC voltage lower than that supplied from the DC power source 6 by rearranging and connecting each component shown in FIG. 15.

As described above, the present invention can be applied not only to the insulation-type power conversion device 100 having the transformer therein as described in Embodiment 1 but also to the non-insulation type power conversion device 200 having only the inductor 15 without a transformer as a magnetic component therein as described in Embodiment 2.

Embodiment 3

Figure 16:
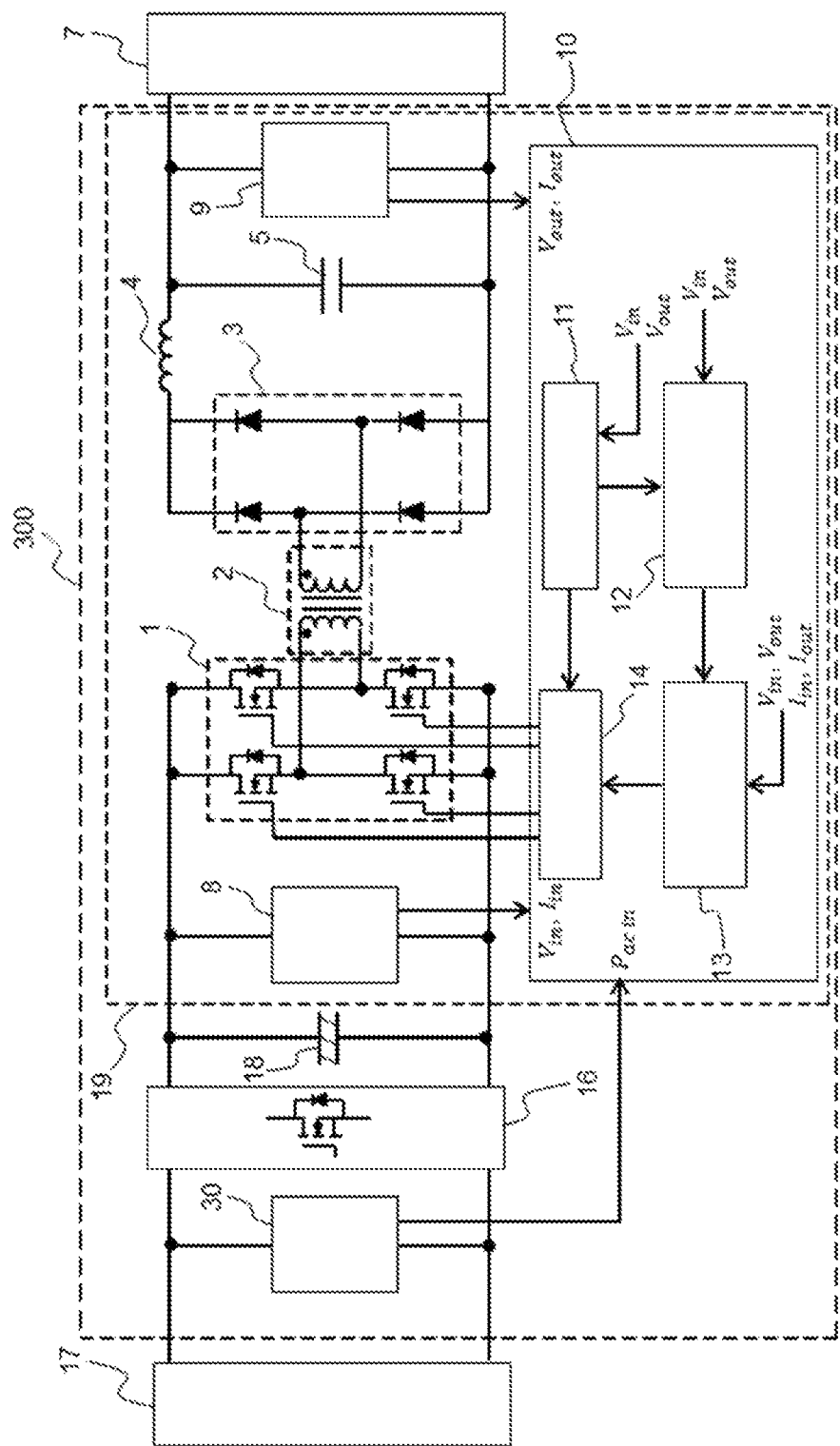
FIG. 16 is a circuit diagram showing the configuration of a power conversion device according to Embodiment 3 of the present invention.

A power conversion device according to Embodiment 3 of the present invention is described below on the basis of the relevant figures. First, the circuit configuration of a power conversion device 300 according to Embodiment 3 is described with reference to FIG. 16. In Embodiment 3, an AC-DC converter is provided in front of a DC-DC converter and connected thereto. In FIG. 16, the power conversion device 300 converts an AC power input from an AC power source 17 to a DC power, to supply the DC power to the load 7. The front AC-DC convertor 16 is a power conversion device having a function of converting the AC power from the AC power source 17 to a DC power while controlling the AC power with high power factor. The AC power source 17 is, for example, a power line system that outputs an AC power of 100 V or 200 V. A smoothing capacitor 18 removes ripple components in the DC power output from the AC-DC convertor 16, and the smoothed power is transmitted to the subsequent DC-DC converter 19.

The subsequent DC-DC converter 19 has the configuration of the power conversion device 100 described in Embodiment 1, and steps up or steps down the input DC voltage, to output the stepped-up or -down DC voltage to the load. It should be noted that since the DC-DC converter 19 has the same circuit configuration as with Embodiment 1, its description is omitted here. In addition, the DC-DC converter 19 may have the same configuration as that of Embodiment 2.

Next, the operation of the power conversion device according to Embodiment 3 is described. The power conversion device 300 converts the AC power from the AC power source 17 to the DC power using the front AC-DC converter 16 while controlling with high power factor, smooths the output DC power of the front AC-DC converter 16 using the smoothing capacitor 18, and steps up or steps down the smoothed output DC power through the 5 subsequent DC-DC converter 19, to supply the DC power to the load 7. The configuration of the controller 10 is the same as that of the controller 10 shown in FIG. 1 of Embodiment 1, but difference in that the controller 10 shown in FIG. 16 receives a signal detected by a second input-side detector 30. The main operation of the controller 10 is the same as with Embodiment 1 except for the operation of the frequency search processor 13.

A case is considered here in which the controller 10 controls constant the AC power $P_{uc\_in}$ input from the AC power source 17 using the detected signal from the second input detector 30 and controls constant the DC voltage output, from the DC-DC converter 19 to the load 7. This control is used for such a case where the load is a battery and it is charged from the power conversion device. In this case, the power conversion efficiency varies with the same change rate according to variation of the DC current output to the load 7. That is, it is conceivable that the larger the output DC current, the higher the power conversion efficiency becomes: and the smaller the output DC current, the lower the power conversion efficiency becomes. For that reason, the frequency search processor 13 in Embodiment 3 may search for the drive frequency in accordance with the flowchart shown in FIG. 17 other than the flowcharts shown in FIGS. 7, 8, and 10 of Embodiment 1.

Figure 17:
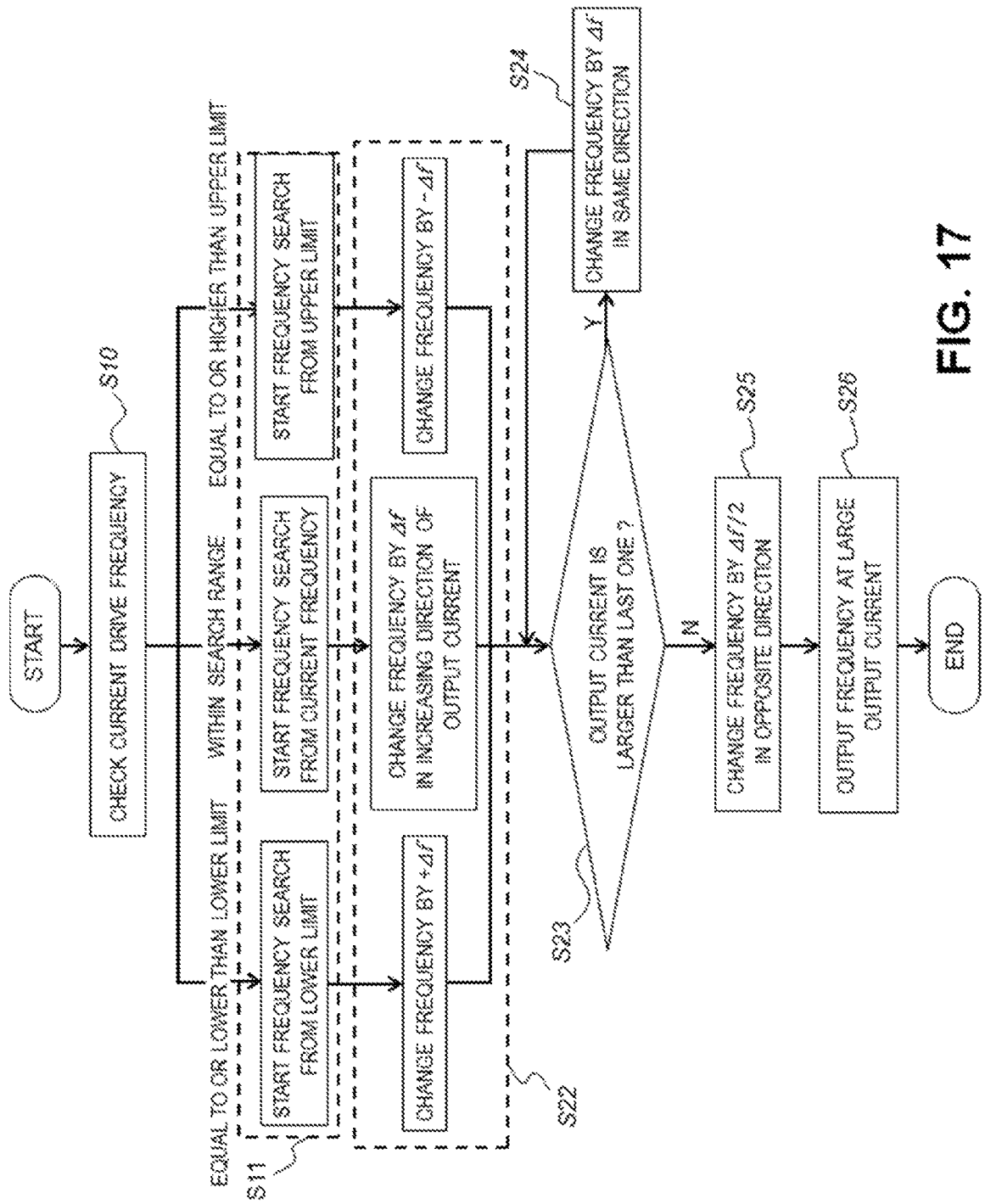
FIG. 17 is a flowchart showing the frequency search flow of a frequency search processor of the power conversion device according to Embodiment 3.

The flowchart shown in FIG. 17 is described. Operations in Steps S10 and S11 of FIG. 17 are the same as those shown in the flowchart of FIG. 10. Note that while in FIG. 10 the power conversion efficiency is calculated at each operating point, in FIG. 17 the output current is detected and compared at each operating point. Step S22 changes by the frequency change amount $\Delta f$ the drive frequency either up or down within the search range, to detect the output current $I_{out}$. Step S23 determines whether or not the detected output current $I_{out}$ is larger than the last detected one. If large ("Y" in S32), the flow branches to Step S24, in which the frequency is changed by $\Delta f$ in the same direction as the last changing direction, and then the output current detected anew is received. Step S24 and Step S23 is repeated until the output current becomes lower than the last one before the frequency is changed by $\Delta f$.

If the output current is equal to or lower than the last one in the determination of Step S23 ("N" in S23), the flow proceeds to Step S25, and the frequency is changed by $\Delta f/2$ in the direction opposite to the last changing direction, and then the output current detected anew is received. Step S26 compares the output current detected in Step S25 with that detected before the frequency is changed by $\Delta f/2$, to output, the frequency that, brings about the larger output current. According to Embodiment 3, since the DC-DC converter 19 is thus capable of operating with high power conversion efficiency, the power conversion device 300 is able to operating with high power conversion efficiency as a whole.

Furthermore, based on the same consideration described above, in a case of controlling constant the DC power output from the DC-DC converter 19 to the load 7 and controlling constant the AC voltage input from the AC power source 17, the power conversion efficiency varies with the same change rate according to variation of the AC current input from the AC power source 17. That is, it is conceivable that the larger the input AC current, the lower the power conversion efficiency becomes; and the smaller the input AC current, the higher the power conversion efficiency becomes. For that reason, the output DC current $I_{out}$ in the flowchart shown in FIG. 17 is altered to the input AC current detected by the second input detector 30, and the frequency search processor 13 may search for the drive frequency that brings about a lower input AC current.

Embodiment 4

Figure 18:
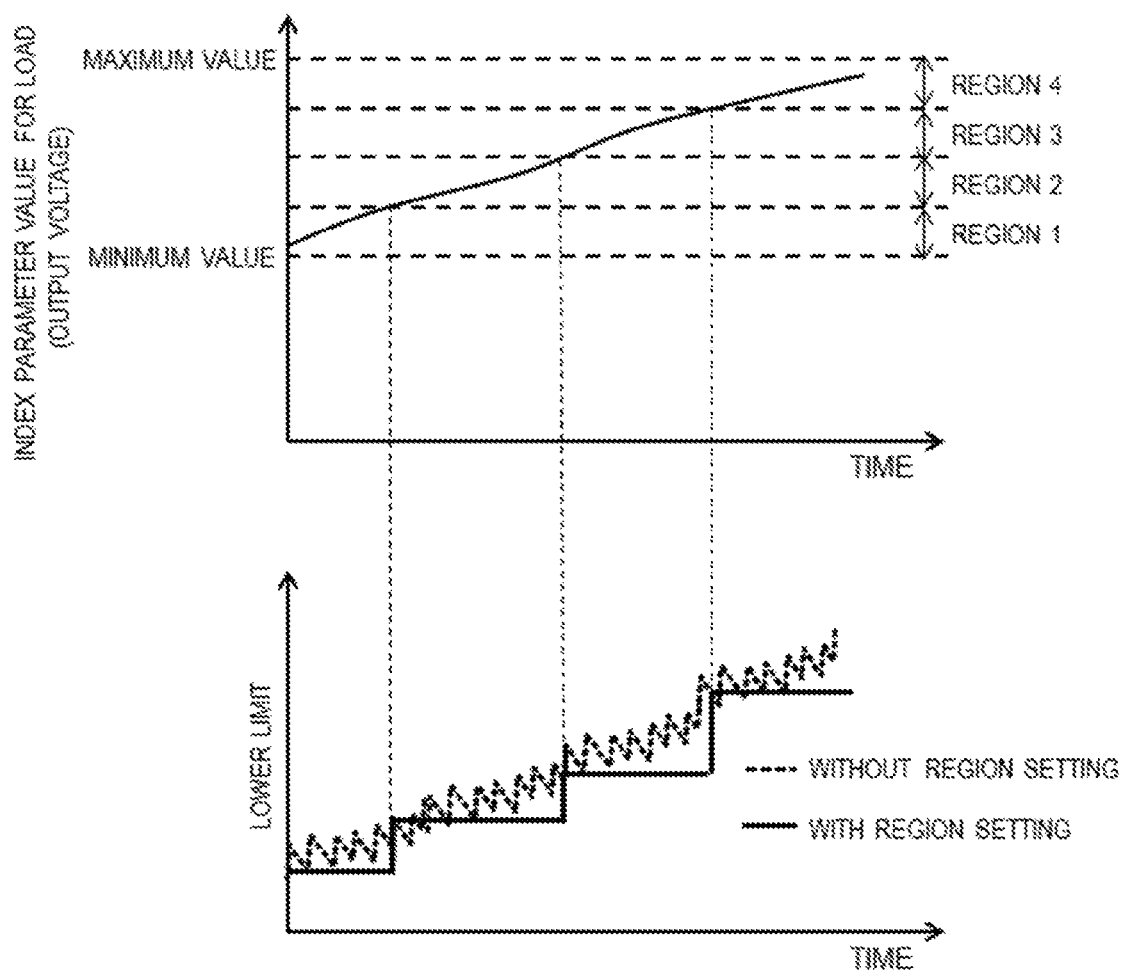
FIG. 18 shows graphs for explaining the operation of a power conversion device according to Embodiment 4 of the present invention.

Embodiment 4 describes a modified example of the output method of the frequency search range calculator 12. The top graph of FIG. 18 illustrates that the output voltage to the load varies with time. The bottom graph of FIG. 18 shows that the lower limit of frequency range output from the frequency search range calculator 12. For example, it is assumed that the lower limit of the frequency search range calculated by the frequency search range calculator 12 varies as indicated by the dotted line in the bottom graph of FIG. 18 when the output voltage to the load varies as shown in the top graph of FIG. 18 owing to change in condition of the load. In Embodiment 1, the frequency search range calculator 12 outputs as the lower limit, for example, values indicated by the dotted line. The calculation of the lower limit uses values calculated using the output voltage, the output current of the power conversion device and/or the input voltage, the input current thereto. In that case, not a few noise components are superimposed on the detected values of the input detector 8 and/or the output detector 9; hence, the output of the frequency search range calculator 12 is expected to be oscillatorily unstable as indicated by the dotted line in the bottom graph of FIG. 18. In Embodiment 4, the frequency search range calculator 12 outputs values indicated by the solid line as the lower limit of the frequency search range. Specifically, a minimum value and a maximum value of the output voltage to the load are set for a condition of the load and the range between the minimum value and the maximum value is divided into a plurality of regions (four regions: a region 1, a region 2, a region 3, and a region 4 in FIG. 18); and the frequency search range calculator 12 does not change output of the lower limit when the detected output, voltage fluctuates within one of the regions. When the detected output voltage varies astride a boundary from one of the regions to its adjacent region, the frequency search range calculator 12 determines by calculation the lower limit at the moment of crossing the boundary, and outputs the determined lower limit as a lower limit for the adjacent region. After that, while the detected output voltage varies within the region, the lower limit is not changed. In this way, by determining and outputting the lower limit every time the detected output voltage crosses a boundary between the divided regions, the output of the frequency search range calculator 12 can be stabilized. While the number of divided regions is set four in FIG. 18 for the lower limit to be output, any number may be set for the number of regions. Since the output becomes from discrete change to continuous change as the number of divided regions is increased, it is possible to reach the maximum power conversion efficiency point with high precision in response to change of the load condition.

While the above is described taking the lower limit as an example, the same applies to the upper limit. For example, a minimum value and a maximum value of the output voltage to the load are set for a condition of the load and the range between the minimum value and the maximum value is divided into a plurality of regions, and the upper limit may be updated and output every time the output voltage crosses a boundary between the regions. While the description is made in the above by the example that the range between the minimum value and the maximum value of the output voltage for a condition of the load is divided into the plurality of regions using the output voltage to the load as an index parameter, the output current or output power to the load may be used as the index parameter in the method of determining the upper limit and the lower limit. In addition, the index parameter used for determining the upper limit and that used for determining the lower limit may be different from each other. Note that the above-described output method may be applied to both the lower limit and the upper limit, or may be applied to either one thereof.

In this way, the range set between the minimum value and the maximum value according to the load condition is divided into a plurality of regions using the value of the index parameter for the load, such as the output power, the output current, and the output voltage to the load, and the lower limit or the upper limit is calculated to be output every time the value of the index parameter crosses a boundary between the regions. By not changing the lower limit or the upper limit while the index parameter for the load has a value within the region, the output of the frequency search range calculator 12 can be kept stable.

Embodiment 5

Figure 19:
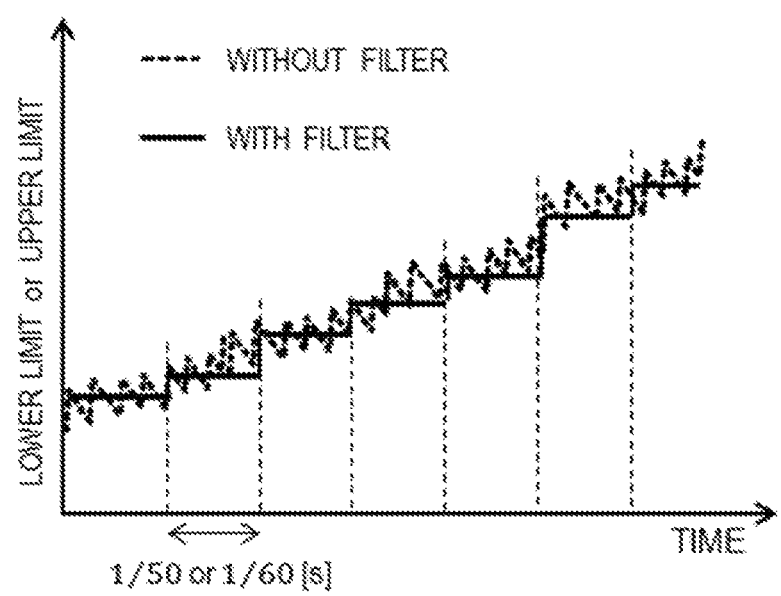
FIG. 19 is a graph for explaining the operation of a power conversion device according to Embodiment 5 of the present invention.
Figure 20:
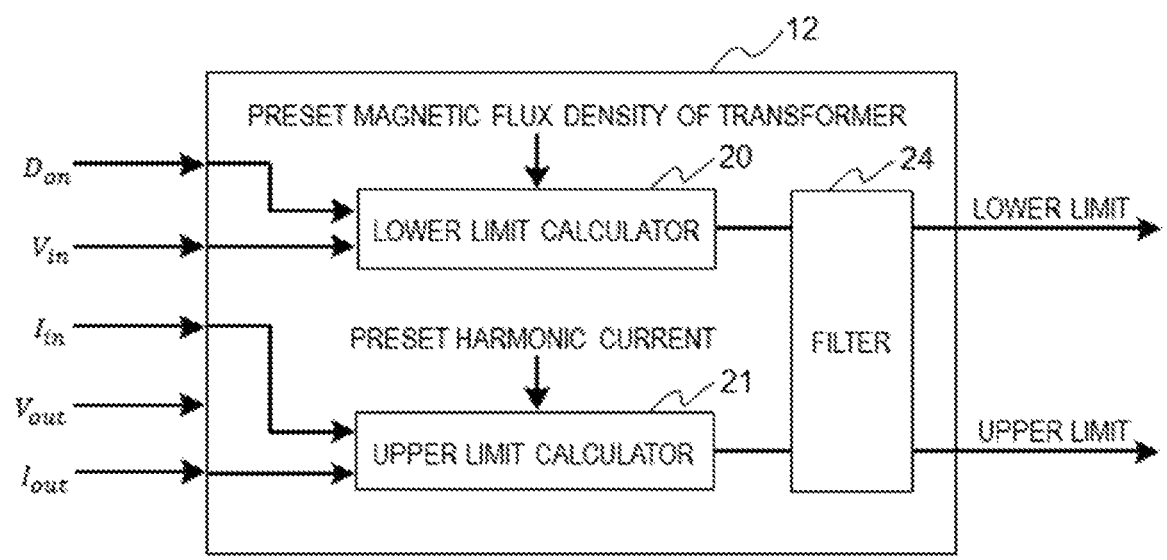
FIG. 20 is a block diagram showing the control of a frequency search range calculator of the power conversion device according to Embodiment 5.
Figure 21:
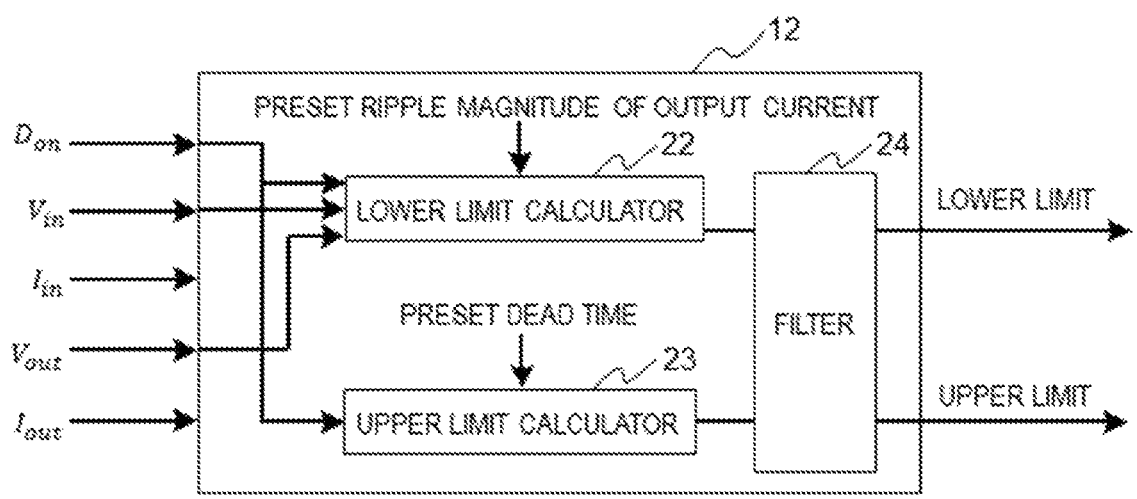
FIG. 21 is a block diagram showing the control of another frequency search range calculator of the power conversion device according to Embodiment 5.

Embodiment 5 describes an output method for the frequency search range calculator 12 of the power conversion device shown in FIG. 16 for converting AC power input from the AC power source to DC power. In the power conversion device of Embodiment 3 for converting the AC power input from the AC power source to the DC power to output the DC power to the load, the upper limit and the lower limit calculated in response to the load by the frequency search range calculator 12 also have a tendency to have an oscillatory waveform as indicated by the dotted line in FIG. 19. This is also the same as with Embodiment 1 and Embodiment 2. In Embodiment 5, a filter 24 is provided, as shown in FIGS. 20 and 21, subsequently to the lower limit calculator and the upper limit calculator shown in FIGS. 2 and 3. The filter updates its output in synchronism with the cycle of the AC power source. Specifically, the frequency search range calculator having the filter determines and outputs the lower limit and the upper limit in synchronism with the cycle of the AC voltage input to the front AC-DC convertor 16, which is described in Embodiment 3 and shown in FIG. 16, and holds the value of the output during one cycle. The output in this case is as shown by the solid line in FIG. 19. In the case of the AC power source 17 being the power line system, the AC voltage has a cycle of 50 Hz or 60 Hz. The cycle is sufficient for the DC-DC converter, which performs switching at a frequency from several kHz to several hundred kHz, to remove higher-frequency noise components, thus being able to determine and output the lower limit and the upper limit and to prevent them from being oscillatory output. Embodiment 5 eliminates the need for setting the plurality of regions using the index parameter for the load, thus being able to sufficiently remove the higher-frequency noise components in comparison to Embodiment 4.

It should be noted that each embodiment of the present invention may be combined or appropriately modified and omitted within the scope and the spirit of the invention.

REFERENCE NUMERALS

1: inverter;
2: transformer;
3: rectifier circuit;
4: smoothing reactor;
5: smoothing capacitor;
6: DC power source;
7: load;
8: input detector;
9: output detector;
30: second input detector;
10: controller;
11: duty calculator;
12: frequency search range calculator;
13; frequency search processor;
14: gate signal generator;
15: inductor;
16: AC-DC convertor;
17: AC power source;
18: smoothing capacitor;
19; DC-DC convertor;
20; 22: lower limit calculator;
21, 23: upper limit calculator;
24: filter; and
100, 200, 300: power conversion device.

The invention claimed is:
1. A power conversion device comprising:
an inverter configured with switching elements to convert a DC input to an AC output, the inverter having a drive frequency for the switching elements by on/off-controlling the switching elements;
a rectifier circuit configured to rectify the AC output converted by the inverter to a DC output; and
a magnetic component having a coil;
wherein the drive frequency is changed when operating condition of the power conversion device is changed, wherein the power conversion device further comprises an input detector adapted to detect input parameters of the DC input to the inverter;
an output detector adapted to detect output parameters of the DC output from the power converter device;

a duty calculator adapted to calculate a duty that is an on-time ratio of the switching elements;

a frequency search range calculator configured to determine a start point and an end point of a frequency search range for determining the drive frequency after the operating condition is changed, using at least one of the input parameters detected by the input detector, at least one of the output parameters detected by the output detector, and a parameter that is the duty calculated by the duty calculator; and a frequency search processor adapted to determine the drive frequency after the operating condition is changed, by searching the frequency search range determined by the frequency search range calculator.

2. The power conversion device of claim 1, wherein the frequency search processor searches for the drive frequency at which a power conversion efficiency of the power conversion device becomes maximal.

3. The power conversion device of claim 1, wherein the frequency search processor searches for the drive frequency at which a loss of the power conversion device becomes minimal.

4. The power conversion device of claim 1, further comprising an AC-DC converter provided in front of the inverter to convert an AC voltage to a DC voltage, wherein the frequency search processor searches for the drive frequency at which an output current detected by the output detector becomes maximal in a case of controlling constant an input power to the AC-DC converter and controlling constant an output voltage of the power conversion device.

5. The power conversion device of claim 1, further comprising an AC-DC converter provided in front of the inverter to convert an AC voltage to a DC voltage, wherein the frequency search processor searches for the drive frequency at which an input current to the AC-DC converter becomes minimal in a case of controlling constant an input voltage to the AC-DC converter and controlling constant an output power of the power conversion device.

6. The power conversion device of claim 1, wherein the frequency search range calculator determines as the start point a frequency at which the magnetic component has a preset magnetic flux density.

7. The power conversion device of claim 6, wherein the magnetic component is a transformer provided between the inverter and the rectifier circuit.

8. The power conversion device of claim 6, wherein the magnetic component is an inductor provided to an output-side of the rectifier circuit.

9. The power conversion device of claim 1, wherein the frequency search range calculator determines as the start point a frequency at which a ripple magnitude of an output current of the power conversion device has a preset value.

10. The power conversion device of claim 1, wherein the frequency search range calculator determines the end point on the basis of harmonic components in an input current detected by the input detector and/or an output current detected by the output detector.

11. The power conversion device of claim 1, wherein the inverter is configured with a series connection of an upper arm and a lower arm each having the switching elements between DC input terminals of the inverter, and a dead time is set so that the switching elements of the upper arm and the lower arm are not in a concurrently turn on state, and where the frequency search range calculator determines the end point on the basis of a condition that an off time of the switching elements determined from the duty calculated by the duty calculator is equal to or longer than the dead time.

12. The power conversion device of claim 1, wherein the frequency search processor searches for and determines the drive frequency after the operating condition is changed, by sequentially changing the drive frequency between the start point and the end point by a set frequency change amount while operating the power conversion device.

13. The power conversion device of claim 6, wherein the frequency search processor determines the start point determined by the frequency search range calculator as the drive frequency after the operating condition is changed.

14. The power conversion device of claim 1, wherein the frequency search range calculator sets for a condition of a load a minimum value and a maximum value of one of index parameters that are an output voltage, an output current, and an output power output from the power conversion device to the load, divides a range between the set minimum value and set maximum value into a plurality of regions, and determines the lower point and/or the end point every time when the one of the detected index parameters crosses a boundary between the regions, to output the determined start point and/or end point to the frequency search processor.

15. The power conversion device of claim 1, further comprising an AC-DC converter provided in front of the inverter to convert an AC voltage to a DC voltage, wherein the frequency search range calculator determines the end point and the start point for each cycle of the AC voltage, to output the determined end point and start point to the frequency search processor.

16. The power conversion device of claim 1, wherein the frequency search range calculator is configured to change the end point and the start point of the frequency search range, according to at least one parameter of the input parameters detected by the input detector, the output parameters detected by the output detector, and the parameter that is the duty calculated by the duty calculator.

17. The power conversion device of claim 1, wherein the frequency search range calculator is configured to determine the end point and the start point of the frequency search range, when a change of the operating condition of the power conversion device is detected.

* * * * *